(12) United States Patent
Butt et al.

(10) Patent No.: US 11,143,815 B1
(45) Date of Patent: Oct. 12, 2021

(54) FIBER OPTIC INTEGRATED-LIGHT DIFFUSERS FOR SENSING APPLICATIONS

(71) Applicants: Khalifa University of Science and Technology, Abu Dhabi (AE); The University of Birmingham, Birmingham (GB)

(72) Inventors: Haider Butt, Abu Dhabi (AE); Mohamed Elsherif, Birmingham (GB)

(73) Assignees: Khalifa University of Science and Technology, Abu Dhabi (AE); The University of Birmingham, Birmingham (GB)

( * ) Notice: Subject to any disclaimer, the term of this patent is extended or adjusted under 35 U.S.C. 154(b) by 65 days.

(21) Appl. No.: 16/848,698

(22) Filed: Apr. 14, 2020

(51) Int. Cl.
| | |
|---|---|
| *G02B 6/02* | (2006.01) |
| *G02B 3/00* | (2006.01) |
| *B29D 11/00* | (2006.01) |
| *G02B 6/32* | (2006.01) |

(Continued)

(52) U.S. Cl.
CPC .... *G02B 6/02338* (2013.01); *B29D 11/00442* (2013.01); *G02B 3/0056* (2013.01); *G02B 6/32* (2013.01); *G02B 6/0025* (2013.01); *G02B 2006/12138* (2013.01)

(58) Field of Classification Search
None
See application file for complete search history.

(56) References Cited

U.S. PATENT DOCUMENTS

| | | | |
|---|---|---|---|
| 4,842,783 A * | 6/1989 | Blaylock | G01N 21/7703 264/1.27 |
| 5,280,548 A | 1/1994 | Atwater et al. | |
| 5,744,794 A | 4/1998 | Michie et al. | |

(Continued)

FOREIGN PATENT DOCUMENTS

| | | |
|---|---|---|
| EP | 94906316.8 A1 | 2/1994 |
| KR | 100693927 B1 | 3/2007 |
| WO | PCT/US18/053853 A1 | 10/2018 |

OTHER PUBLICATIONS

"Product Classification", USFDA, Retreived from "https://www.accessdata.fda.gov/scripts/cdrh/cfdocs/cfPCD/classification.cfm?ID=MDS", Apr. 20, 2020, 2 pages.

(Continued)

*Primary Examiner* — Jerry Rahll
(74) *Attorney, Agent, or Firm* — Billion & Armitage

(57) ABSTRACT

Embodiments include a fiber optic probe comprising an optical fiber, and a sensor component attached to the optical fiber, the sensor component including an asymmetric microlens array imprinted on a stimuli-responsive hydrogel. Embodiments further include a method of fabricating a fiber optic probe comprising depositing a stimuli-responsive hydrogel precursor solution on a substrate mold, the substrate mold including a concave asymmetric microlens array; contacting an end of an optical fiber with the stimuli-responsive hydrogel precursor solution deposited on the substrate mold; and exposing the end of the optical fiber and the stimuli-responsive hydrogel precursor solution to light to form a stimuli-responsive hydrogel sensor imprinted with a convex asymmetric microlens array and attached to the end of the optical fiber. Embodiments further include systems comprising the fiber optic probes.

20 Claims, 37 Drawing Sheets

(51) Int. Cl.
*F21V 8/00* (2006.01)
*G02B 6/12* (2006.01)

(56) References Cited

U.S. PATENT DOCUMENTS

| | | | |
|---|---|---|---|
| 6,694,157 | B1 | 2/2004 | Stone et al. |
| 7,616,844 | B2 | 11/2009 | Hjelme et al. |
| 7,625,764 | B2 | 12/2009 | Stayton et al. |
| 9,184,199 | B2 | 11/2015 | Pitts et al. |
| 10,317,046 | B2 | 6/2019 | Liu et al. |
| 2003/0112443 | A1* | 6/2003 | Hjelme ............ G01N 21/7703 356/480 |
| 2006/0198576 | A1 | 9/2006 | Furusawa et al. |
| 2009/0074349 | A1 | 3/2009 | Hjelme et al. |
| 2010/0111136 | A1 | 5/2010 | Huang et al. |
| 2019/0046463 | A1 | 2/2019 | Choi et al. |

OTHER PUBLICATIONS

Bajgrowicz-Cieslak, et al., "Optical Glucose Sensors Based on Hexagonally-Packed 2.5-Dimensional Photonic Concavities Imprinted in Phenylboronic Acid Functionalized Hydrogel Films", RSC Advances, vol. 7, 2017, pp. 53916-53924.
Boeckxstaens, et al., "Physiological Variations in Blood Glucose Concentration Affect Oesophageal Motility and Sensation in Normal Subjects", Neurogastroenterology and Motility, vol. 9, No. 4, Dec. 1997, pp. 239-246.
Cao, et al., "Highly Sensitive Surface Plasmon Resonance Biosensor Based on a Low-Index Polymer Optical Fiber", Optics Express, vol. 26, No. 4, Feb. 19, 2018, pp. 3988-3994.
Chew, "Persistent Effects of Intensive Glycemic Control on Retinopathy in Type 2 Diabetes in the Action to Control Cardiovascular Risk in Diabetes (ACCORD) Follow-On Study", Diabetes Care, vol. 39, 2016, pp. 1089-1100.
Choi, et al., "Light-Guiding Hydrogels for Cell-Based Sensing and Optogenetic Synthesis In Vivo", Nature Photonics, vol. 7, 2013, pp. 987-994.
Choi, et al., "Step-Index Optical Fiber Made of Biocompatible Hydrogels", Advanced Materials, vol. 27, No. 27, 2016, pp. 4081-4086.
Crofford, et al., "Diabetes Control and Complications Trial (DCCT): Results of Feasibility Study", Diabetes Care, vol. 10, No. 1, Jan.-Feb. 1987, pp. 1-19.
Doran, et al., "Automated Insulin Infusion Trials in the Intensive Care Unit", Diabetes Technology & Therapeutics, vol. 6, No. 2, 2004, pp. 155-165.
Elsherif, et al., "Wearable Contact Lens Biosensors for Continuous Glucose Monitoring Using Smartphones", ACS Nano, vol. 12, May 11, 2018, pp. 5452-5462.
Fang, et al., "Microlens Fabrication by Replica Molding of Electro-Hydrodynamic Printing Liquid Mold", Micromachines, vol. 11, 2020, pp. 1-10.
Finney, et al., "Glucose Control and Mortality in Critically Ill Patients", JAMA, vol. 290, No. 15, Oct. 15, 2003, pp. 2041-2047.
Haga, et al., "The Effect of Tight Glycaemic Control, During and After Cardiac Surgery, on Patient Mortality and Morbidity: A Systematic Review and Meta-Analysis", Journal of Cardiothoracic Surgery, vol. 6, Article 3, 2011, pp. 1-10.
Heller, et al., "Electrochemical Glucose Sensors and Their Applications in Diabetes Management", Chemical Reviews, vol. 108, No. 7, 2008, pp. 2482-2505.
Heo, et al., "Long-Term In Vivo Glucose Monitoring Using Fluorescent Hydrogel Fibers", Proceedings of the National Academy of Sciences (PNAS), vol. 108 2011, pp. 1-5.
Hisamitsu, et al., "Glucose-Responsive Gel from Phenylborate Polymer and Poly(Vinyl Alcohol): Prompt Response at Physiological pH Through the Interaction of Borate with Amino Group in the Gel", Pharmaceutical Research, vol. 14, No. 3, 1997, pp. 289-293.
James, et al., "A Glucose-Selective Molecular Fluorescence Sensor", Angewandte Chemie International Edition in English, vol. 33, No. 21, 1994, pp. 2207-2209.
Kabilan, et al., "Holographic Glucose Sensors", Biosensors and Bioelectronics, vol. 20, 2005, pp. 1602-1610.
Kondepati, et al., "Recent Progress in Analytical Instrumentation for Glycemic Control in Diabetic and Critically Ill Patients", Analytical and Bioanalytical Chemistry, vol. 388, 2007, pp. 545-563.
Krinsley, et al., "Cost Analysis of Intensive Glycemic Control in Critically Ill Adult Patients", Chest, vol. 129, 2006, pp. 644-650.
Li, et al., "Affinity Based Glucose Measurement Using Fiber Optic Surface Plasmon Resonance Sensor With Surface Modification by Borate Polymer", Sensors and Actuators B, vol. 213, 2015, pp. 295-304.
Li, et al., "Glucose Measurement Using Surface Plasmon Resonance Sensor With Affinity Based Surface Modification by Borate Polymer", 2015 18th International Conference on Solid-State Sensors, Actuators and Microsystems (Transducers 2015), Jun. 21-25, 2015, pp. 1569-1572.
Lin, et al., "Detection of Cadmium by a Fiber-Optic Biosensor Based on Localized Surface Plasmon Resonance", Biosensors and Bioelectronics, vol. 24, 2009, pp. 1213-1218.
Liu, et al., "3D Fabrication of Spherical Microlens Arrays on Concave and Convex Silica Surfaces", Microsystem Technologies, vol. 25, May 29, 2018, 10 pages.
Montori, et al., "Hyperglycemia in Acutely Ill Patients", JAMA, vol. 288, No. 17, Nov. 6, 2002, pp. 2167-2169.
Nguyen, et al., "Non-Interferometric Tomography of Phase Objects Using Spatial Light Modulators", Journal of maging, vol. 2, 2016, pp. 1-16.
Paschoitta, "Microlens Arrays", RP Photonics Encyclopedia, Retrieved from "https://www.rpphotonics.com/microlens_arrays.html", 2020, pp. 1-5.
Rapsang, et al., "Blood Sugar Control in the Intensive Care Unit: Time to Relook", Southern African Journal of Anaesthesia and Analgesia, vol. 20, No. 4, 2014, pp. 185-189.
Ruckh, et al., "Implantable Nanosensors: Toward Continuous Physiologic Monitoring", Analytical Chemistry, vol. 36, Dec. 10, 2013, pp. 1314-1323.
Selsman, "Replica Molding (REM)", Retrieved from "https://openwetware.org/wiki/Replica_molding_(REM)_-_Adam_Selsman", 2020, pp. 1-5.
Singh, et al., "Fabrication and Characterization of a Surface Plasmon Resonance Based Fiber Optic Sensor Using Gel Entrapment Technique for the Detection of Low Glucose Concentration", Sensors and Actuators B, vol. 177, 2013, pp. 589-595.
Skyler, et al., "Intensive Glycemic Control and the Prevention of Cardiovascular Events: Implications of the Accord, Advance, and VA Diabetes Trials", Circulation, vol. 119, 2009, pp. 351-357.
Srinivasan, et al., "Factors Associated With No Apparent Coronary Artery Disease in Patients With Type 2 Diabetes Mellitus for More Than 10 Years of Duration: A Case Control Study", Cardiovascular Diabetology, vol. 14, Article 146, 2015, pp. 1-7.
Srivastava, et al., "Localized Surface Plasmon Resonance-Based Fiber Optic U-Shaped Biosensor for the Detection of Blood Glucose", Plasmonics, vol. 7, 2012, pp. 261-268.
Thome-Duret, et al., "Use of a Subcutaneous Glucose Sensor To Detect Decreases in Glucose Concentration Prior to Observation in Blood", Analytical Chemistry, vol. 68, No. 21, Nov. 1, 1996, pp. 3822-3826.
Thompson, et al., "Hyperglycemia in the Hospital", Diabetes Spectrum, vol. 18, No. 1, 2005, pp. 20-27.
Tierney, et al., "Determination of Glucose Levels Using a Functionalized Hydrogel-Optical Fiber Biosensor: Toward Continuous Monitoring of Blood Glucose in Vivo", Analytical Chemistry, vol. 81, No. 9, May 1, 2009, pp. 3630-3636.
Umpierrez, et al., "Hyperglycemia: An Independent Marker of In-Hospital Mortality in Patients with Undiagnosed Diabetes", The Journal of Clinical Endocrinology & Metabolism, vol. 87, No. 3, 2002, pp. 978-982.

(56) References Cited

OTHER PUBLICATIONS

Vaddiraju, et al., "Technologies for Continuous Glucose Monitoring: Current Problems and Future Promises", Journal of Diabetes Science and Technology, vol. 4, No. 6, Nov. 2010, pp. 1540-1562.
Van Den Berghe, et al., "Analysis of Healthcare Resource Utilization With Intensive Insulin Therapy in Critically III Patients", Critical Care Medicine, vol. 34, No. 3, 2006, pp. 1-5.
Van Den Berghe, "Insulin Therapy in Critical Illness", Canadian Journal of Diabetes, vol. 28, No. 1, 2004, pp. 43-49.
Van Den Berghe, et al., "Intensive Insulin Therapy in Critically III Patients", The New England Journal of Medicine, vol. 345, No. 19, Nov. 8, 2001, pp. 1359-1367.
Veetil, et al., "A Glucose Sensor Protein for Continuous Glucose Monitoring", Biosensors and Bioelectronics, vol. 26, 2010, pp. 1650-1655.
Williams, et al., "Effects of Admission Hyperglycemia on Mortality and Costs in Acute Ischemic Stroke", Neurology, vol. 59, 2002, pp. 67-71.
Wilson, "Hydrogel-Based Fiber-Optic Sensor Detects Water Ingress in Cables", Lightwave, Retreived from "https://www.lightwaveonline.com/home/article/16662202/hydrogelbased-fiberoptic-sensor-detects-water-ingress-in-cables", Apr. 1, 1995, 2 pages.
Yang, et al., "A Comparison between Venous and Finger-Prick Blood Sampling on Values of Blood Glucose", 2012 International Conference on Nutrition and Food Sciences IPCBEE, vol. 39, 2012, pp. 206-210.
Yetisen, et al., "Glucose-Sensitive Hydrogel Optical Fibers Functionalized with Phenylboronic Acid", Advanced Materials, vol. 29, Article 1606380, 2017, pp. 1-11.
Zhang, et al., "Hydrogel-Based Glucose Sensors: Effects of Phenylboronic Acid Chemical Structure on Response", Chemistry of Materials, vol. 25, Jul. 9, 2013, pp. 3239-3250.
Zhou, et al., "Recent Advancements in Optical Microstructure Fabrication Through Glass Molding Process", Frontiers of Mechanical Engineering, 2017, pp. 1-20.
Almeida, et al., "Temperature and pH stimuli-responsive polymers and their applications in controlled and self-regulated drug delivery", Journal of Applied Pharmaceutical Science 02 (06); 2012: 01-10.
Arregui, et al., "An experimental study about hydrogels for the fabrication of optical fiber humidity sensors", Sensors and Actuators B 96 (2003) 165-172.
Caló, et al., "Biomedical applications of hydrogels: A review of patents and commercial products", European Polymer Journal 65 (2015) 252-267.
Chandra, "Strain responsive concave and convex microlens arrays", Physics Letters, vol. 91, Article No. 251912, Dec. 2007, 5 pages.
De Las Heras Alarcón, et al., "Stimuli responsive polymers for biomedical applications", Chem. Soc. Rev., Feb. 8, 2005, 34, 276-285.
Elsherif, et al., "Glucose Sensing with Phenylboronic Acid Functionalized Hydrogel-Based Optical Diffusers", ACS Mano 2018, 12, 2283-2291.
Gil, et al., "Stimuli-reponsive polymers and their bioconjugates", Prog. Polym. Sci. 29 (2004) 1173-1222.
Hoffman, "Stimuli-responsive polymers: Biomedical applications and challenges for clinical translation", Advanced Drug Delivery Reviews 65 (2013) 10-16.
Richter, et al., "Review on Hydrogel-based pH Sensors and Microsensors", Sensors 2008, 8, 561-581.

\* cited by examiner

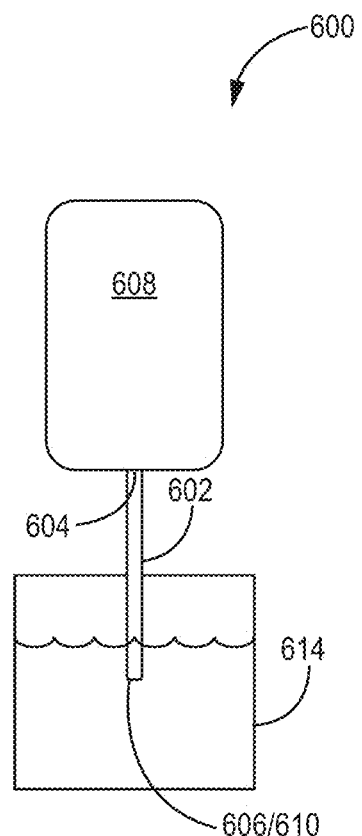
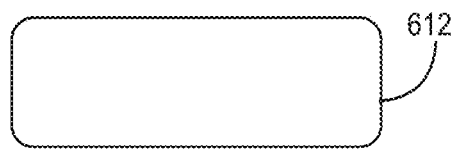
FIG. 6

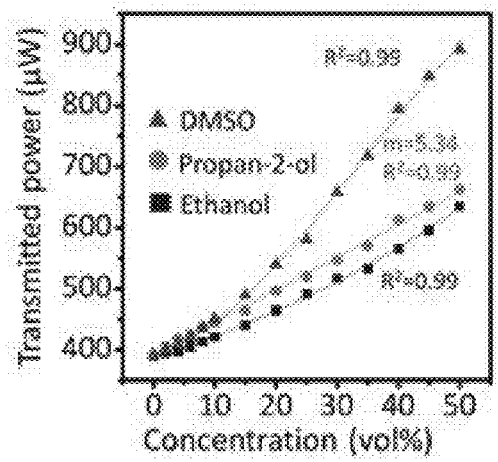
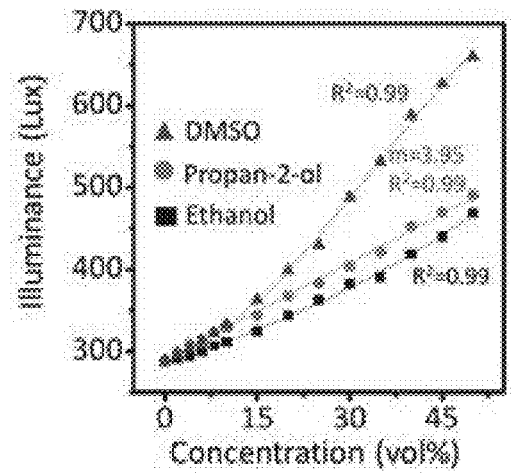
FIG. 10E  FIG. 10F

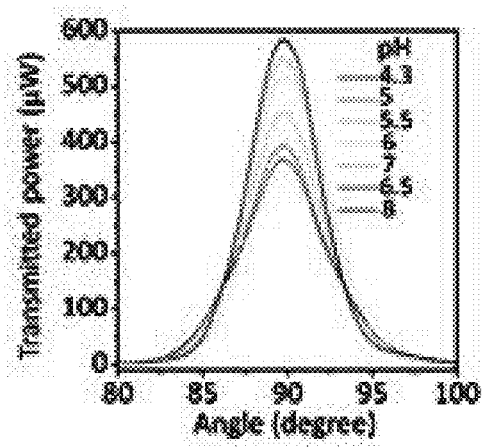 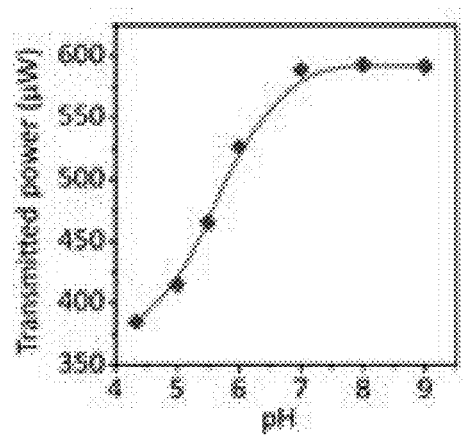
FIG. 11A FIG. 11B

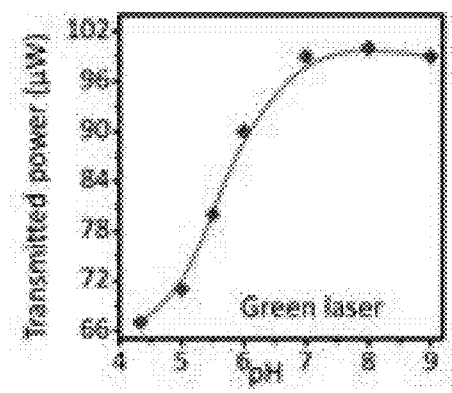 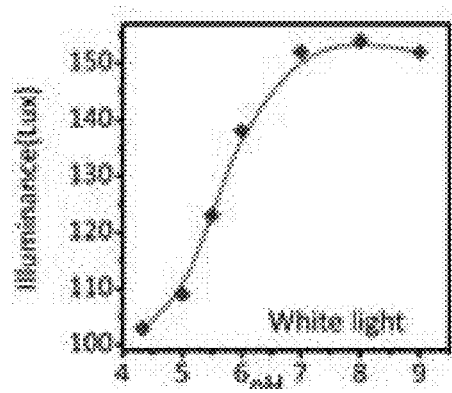
FIG. 11F  FIG. 11G

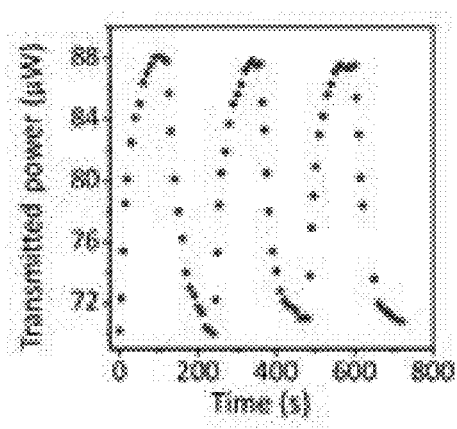 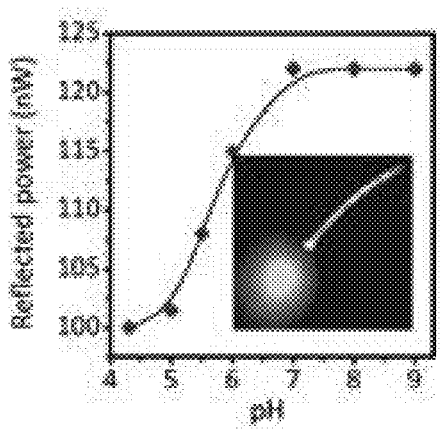
FIG. 11J  FIG. 11K

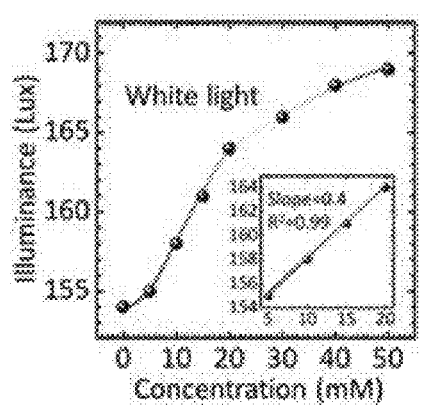 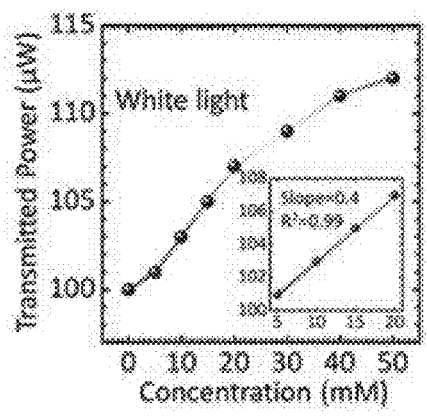
FIG. 14H  FIG. 14I

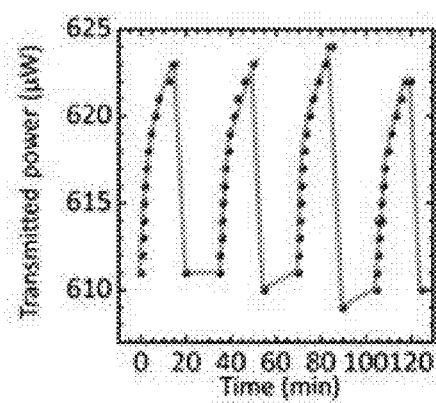 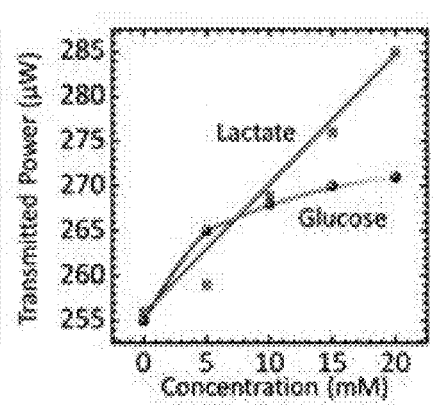
FIG. 15D  FIG. 15E

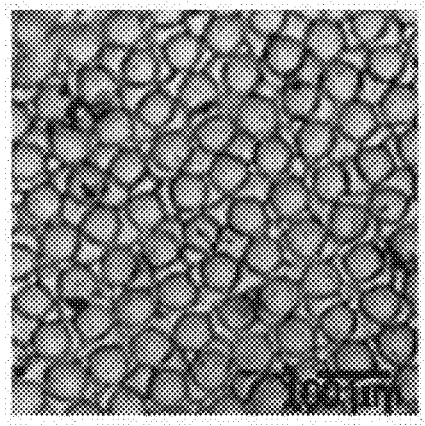
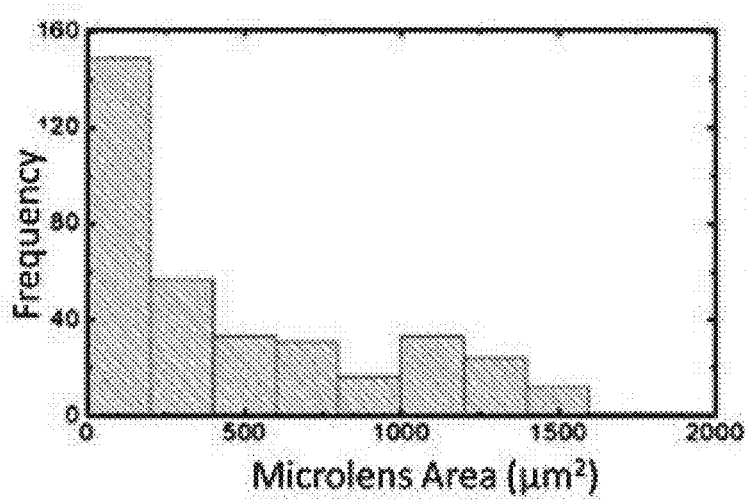
FIG. 17A  FIG. 17B

FIBER OPTIC INTEGRATED-LIGHT DIFFUSERS FOR SENSING APPLICATIONS

BACKGROUND

It has been reported that certain fiber optic probes can be used for sensing applications. For example, fiber optic probes based on Fabry-Perot interferometry, surface plasmon resonance, amplitude absorbance measurements, and organic dyes have been reported for sensing applications. However, these fiber optic probes are limited in that they require high-quality films, coherent light sources, high-cost instrumentation, bulky equipment, complicated output signal processing, and complex fabrication processes, among other things.

SUMMARY

According to one or more aspects, a fiber optic probe can include an optical fiber, and a sensor component attached to the optical fiber, the sensor component including an asymmetric microlens array imprinted on a stimuli-responsive hydrogel.

According to one or more further aspects, a method of fabricating a fiber optic probe can include (a) depositing a light-curable stimuli-responsive hydrogel precursor solution on a substrate mold having a surface including an inverse asymmetric microlens array; (b) contacting an end portion of an optical fiber with the light-curable stimuli-responsive hydrogel precursor solution deposited on the substrate mold; and (c) exposing the end portion of the optical fiber and light-curable stimuli-responsive hydrogel precursor solution to light to form a stimuli-responsive hydrogel sensor imprinted with an asymmetric microlens array and attached to the end portion of the optical fiber.

According to one or more additional aspects, a system can include a fiber optic probe including an optical fiber and a sensor component attached to the optical fiber, the sensor component including an asymmetric microlens array imprinted on a stimuli-responsive hydrogel; a light source coupled to the fiber optic probe, wherein the light source is configured to transmit light through the optical sensor; and a light sensor for detecting light transmitted through the asymmetric microlens array or light reflected from the asymmetric microlens array.

BRIEF DESCRIPTION OF THE DRAWINGS

FIG. 6 is a schematic diagram of a system configured to operate in transmission mode in accordance with one or more embodiments of the invention.

FIGS. 10A-10I relate to the interrogation of a fiber optic probe for alcohol sensing in a transmission configuration and a reflection configuration, showing (A) a schematic of the setup utilized to investigate the fiber optic probe's response in transmission mode, with the setup including fiber probe coupled to a laser pointer at one end and the alcohol-responsive hydrogel sensor attached to the end of the optical fiber was soaked in an alcohol solution container placed over a photodetector or a smartphone; (B)-(C) microscopic images of a multimode silica fiber; (D) photographs of a silica fiber with a hydrogel sensor attached to an end thereof guiding different monochromatic light beams; (E) graphical views showing the maximum optical transmitted power ($P_t$) from the fiber optic probe versus alcohol concentrations while said probe was illuminated with a green laser (532 nm) and the output signals were recorded with an optical power meter; (F) a graphical view showing the illuminance of the fiber optic probe detected by a smartphone while the probe was submerged in various alcohol concentrations recorded and illuminated by a white light source; (G) a schematic of the setup utilized to investigate the fiber optic probe in reflection mode, where the fiber optic probe was coupled with a white light source and a power meter using a 2×1 coupler and where the coupler included seven optical fibers, with one fiber illuminating the fiber optic probe and the other six fibers guiding reflected light from the probe to the power meter; (H) a graphical view showing reflected power through the fiber optic probe versus alcohol concentrations; and (I) a graphical view showing the maximum transmitted power ($P_t$) of the fiber optic probe tested in ethanol (5% v/v) and DI water for 6 cycles versus time, in accordance with one or more embodiments of the present invention.

FIGS. 11A-11K relates to interrogation of the pH-responsive hydrogel sensor attached chemically on a glass slide and the fiber optic probe for pH sensing in a transmission configuration and a reflection configuration, showing (A) a graphical view of the spatial optical profiles of the transmitted diffused light passing through the pH-responsive hydrogel sensor while the pH-responsive hydrogel sensor was submerged in various pH solutions and illuminated by a green laser beam, 532 nm at 24° C.; (B) a graphical view showing the maximum transmitted power for the beam passing through the pH-sensor submerged in various pH solutions; (C) a schematic diagram of the setup utilized for testing the pH-responsive hydrogel sensor in reflection mode, where the sensor was illuminated by a monochromatic beam (532 nm) and the reflected signal was picked up by an optical power meter; (D) a graphical view showing the maximum optical reflected power from the pH-responsive hydrogel sensor exposed to various pH solutions and illuminated by a green laser beam; (E) a schematic diagram of the setup utilized for testing the fiber optic probe in transmission mode; (F) a graphical view showing the maximum transmitted power of the fiber probe recorded when the functionalized probe tip was submerged in various pH solutions; (G) a graphical view showing the maximum illuminance emitted from the fiber optic probe recorded by a smartphone when the probe was submerged in different pH solutions; (H) a graphical view showing the reflected power in the fiber optic probe recorded by the optical power meter when the fiber optic probe was soaked in various pH solutions; (I) a graphical view showing kinetic swelling of the pH-responsive hydrogel sensor when said hydrogel sensor was soaked in a pH 6.0 solution and $P_t$ was recorded; (J) a graphical view showing the maximum transmitted power of the fiber tested in two different pH solutions for 3 cycles versus time; (k) a graphical view showing the reflected optical power in the biocompatible fiber probe when it was submerged in various pH solutions, in accordance with one or more embodiments of the present invention.

FIGS. 14A-14I relate to detection of glucose using a glucose-responsive hydrogel sensor attached to a silica optical fiber in transmission mode, showing (A) a schematic diagram of the setup utilized to test the functionalized fiber in transmission mode; (B)-(C) optical microscopy images of the silica multimode fiber; (D) photographs of the silica fiber optic probe coupled to blue, green, and red lasers; (E) a graphical view showing the maximum optical transmitted power ($P_t$) of the functionalized fiber submerged in various glucose concentrations over time; (F) a graphical view showing the $P_t$ of the fiber against glucose concentrations (0-50 mM), while the fiber optic probe was coupled with a green laser and the readout was recorded by a power meter, with the inset showing measurements for the glucose range of 5-20 m; (G) a graphical view showing the $L_t$ of the fiber optic probe versus glucose concentrations where the fiber optic probe was coupled to a green laser pointer and the readouts were captured by an ambient light sensor of a smartphone, with the inset showing the glucose concentration range of 5-20 mM; (H) a graphical view showing the $L_t$ of the fiber optic probe versus glucose concentrations while the fiber optic probe was coupled with a broadband white light source and the output signals were captured by an ambient light sensor of a smartphone, with the inset showing the glucose concentration range of 5-20 mM; and (I) a graphical view showing the $P_t$ of the fiber optic probe versus glucose concentrations where the fiber optic probe was coupled with a broadband white light source and the output signals were recorded by an optical power meter, with the inset showing the glucose concentration range of 5-20 mM, in accordance with one or more embodiments of the present invention.

FIGS. 15A-15G relate to the silica fiber optic probe used for glucose sensing in reflection mode, showing (A) a schematic diagram of the setup utilized for interrogating the fiber optic probe in the reflection configuration; (B) a graphical view showing the optical reflected power versus the glucose concentrations while the fiber optic probe was coupled with a white light source and the output signal was captured by an optical power meter; (C) a graphical view showing the maximum transmitted power of the fiber optic probe over time at 10 mM glucose concentration; (D) a graphical view showing the fiber optic probe's output signal versus time at a glucose concentration of 10 mM for four cycles as the green laser laser pointer coupled with the fiber optic probe and the readings were recorded in transmission mode, the fiber optic probe was reset in acetate buffer (pH 4.6), and the transmitted power baseline was 611±1 µW and increased to 623±1 µW; (E) a graphical view showing the lactate and glucose concentrations versus the $P_t$ at human body temperature, 37° C., the test was carried out in transmission mode; (F) a graphical view showing the solution's pH against the fiber optic probe's output signal recorded in the transmission mode; (G) a graphical view showing solution temperature versus the fiber optic probe's output signals, the test was carried out in transmission mode, in accordance with one or more embodiments of the present invention.

FIGS. 17A-17B show (A) an optical microscopic image of light diffusing microstructures (an asymmetric microlens array) replicated on a hydrogel surface and (B) a graphical view showing a distribution of the light diffusing microstructures, in accordance with one or more embodiments of the present invention.

DETAILED DESCRIPTION

Figure 1A:
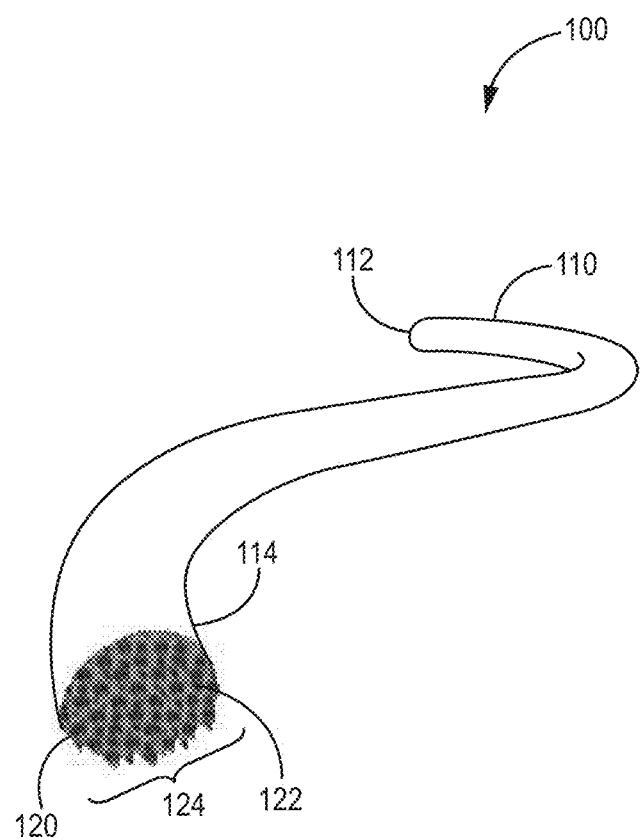
FIG. 1A is a schematic diagram of a fiber optic probe in accordance with one or more embodiments of the invention.

The present invention relates to fiber optic-integrated light diffusers for sensing applications. More specifically, the present invention relates to fiber optic probes that include light diffusing microstructures imprinted on a stimuli-responsive polymeric material that is attached to an end portion of an optical fiber and can be used for sensing parameters. The fiber optic probes disclosed herein can sense a wide variety of parameters with high sensitivity and rapid response times, while also overcoming many of the challenges and shortcomings of conventional fiber optic probes in terms of fabrication, practicality, portability, and readout methodology. For example, in addition to being reusable, offering electromagnetic immunity, remote and implantable sensing capabilities, miniaturization, and low volume samples, the fiber optic probes of the present invention do not require high quality films, coherent light sources, costly instrumentation, bulky equipment, complex fabrication techniques, or output signal processing. For example, some embodiments disclose a method of fabricating fiber optic probes in which the sensor component is synthesized, imprinted with light diffusing microstructures, and attached to an optical fiber to form the fiber optic probe in a single simple and easy step. The fiber optic probes thus avoid the challenging steps involved in, for example, fabricating high quality films, forming precisely shaped droplets as sensors, and immobilizing a hydrogel on a thin metal layer.

As described above, the fiber optic probes of the present invention generally comprise a sensor component attached to an end of an optical fiber. The sensor component can include a stimuli-responsive polymeric material imprinted with light diffusing microstructures that form an asymmetric microlens array. While not wishing to be bound to a theory, it is believed that the light diffusing microstructures can modulate the incident angle of reflected rays in the optical fiber. For example, in the presence or absence of at least one stimulus, a polymeric material such as a hydrogel can undergo a positive or negative volumetric shift that alters the refractive index and the dimensions of the light diffusing microstructures. A positive volumetric shift can, for example, decrease the scattering angle of reflected rays in the core of the optical fiber such that more rays satisfy the guidance condition and remain confined in the fiber core. As a result, the optical power from the fiber optic probe can undergo a change (e.g., an increase or a decrease) in response to the stimulus and this change in optical power can be correlated to the parameter(s) being sensed, such as a pH level, analyte concentration, etc.

The versatility of the materials that can be used to form the fiber optic probes and the wide range of parameters capable of being sensed by these materials provides a high degree of flexibility and tunability, and thus broadens the scope of sensing applications in which the fiber optic probes can be used. For example, embodiments describe fiber optic probes that can be used in remote sensing and implantable biosensing applications. Accordingly, the term sensing is used broadly herein and refers to any type of sensing known in the art. For example, the fiber optic probes can be used for sensing at least one parameter, detecting at least one parameter, measuring at least one parameter, monitoring at least one parameter, and so on. In addition, the parameters capable of being sensed are not particularly limited, given that sensor components such as stimuli-responsive hydrogels can be customized (e.g., via the selection and combination of monomer and/or crosslinker, relative amounts of monomer and/or crosslinker, etc.) to sense a particular parameter (e.g., pH, etc.) or a particular range of a parameter (e.g., pH levels between 5-7). Parameters capable of being sensed by the fiber optic probes disclosed herein include, for example and without limitation, analytes, analyte concentrations, temperatures, pH levels, ionic strength, wavelengths of light, ion concentrations, electric fields, magnetic fields, solvents, pressures, and the like. For example, the fiber optic probes can be used in remote or implantable applications for continuous or intermittent real-time quantitative sensing, monitoring, detecting, and/or measuring of glucose, lactates, proteins, DNA, alcohols, metabolites, biomarkers, pH (e.g., gastric pH), oxygen, compounds containing oxygen such as metal oxides and/or metal hydroxides (e.g., rusting), carbon dioxide, in various aqueous solutions such as human blood and/or plasma, among others.

Referring now to FIG. 1A, an isometric view of a fiber optic probe 100 is shown, according to one or more embodiments of the invention. The fiber optic probe 100 comprises an optical fiber 110 and a sensor component 120. The optical fiber 110 has a proximal end 112 and a distal end 114. The sensor component 120 is attached to the distal end 114 of the optical fiber 110 and includes a stimuli-responsive polymeric material 122. Light diffusing microstructures forming an asymmetric microlens array 124 can be imprinted on the stimuli-responsive polymeric material 122 to obtain the sensor component 120.

The optical fiber 110 and sensor component 120 can be attached via various types of associative interactions. Examples of associative interactions include, without limitation, chemical interactions, physical interactions, and combinations thereof. In some embodiments, the sensor component 120 is chemically attached to the optical fiber 110. In some embodiments, the sensor component 120 is covalently bonded to the optical fiber 110. In some embodiments, the sensor component 120 is attached to the optical fiber 110 via hydrogen bonding. In some embodiments, the sensor component 120 is attached to the optical fiber 110 via ionic interactions. In some embodiments, the sensor component 120 is attached to the optical fiber 110 via electrostatic dipole-dipole interactions. In some embodiments, the sensor component 120 is attached to the optical fiber 110 via van der Waal's forces. In some embodiments, the sensor component 120 is attached to the optical fiber 110 via one or more of covalent bonding, hydrogen bonding, ionic interactions, electrostatic dipole-dipole interactions, and van der Waal's forces, among other covalent and noncovalent interactions.

The optical fiber 110 is not particularly limited. The optical fiber 110 can include a core and the core can optionally be surrounded by one or more layers, such as cladding, polymer coatings, protective outer jackets, and the like, or the optical fiber 110 can comprise or consist of a core, wherein the core can comprise or consist of a polymeric material. Suitable optical fibers 110 include single-mode optical fibers and multi-mode optical fibers. For example, in some embodiments, the optical fiber 110 includes a multi-mode silica fiber. Other commercially available optical fibers can also be used as the optical fiber 110. In addition, the incompatibility of optical fibers, such as those which are commercially available, with biological tissues can limit their use in medical diagnostics due to the immune reactions in vivo. Accordingly, in some embodiments, the optical fiber 110 comprises or consists of biocompatible polymeric materials, such as hydrogels, formed in accordance with the methods disclosed herein. Exemplary biocompatible polymeric materials include light-curable and in particular UV-curable polymers and hydrogels, such as certain stimuli-responsive hydrogels. For example, in some embodiments, the optical fiber 110 comprises or consists of polyethylene glycol diacrylate. In some embodiments, the optical fiber 110 comprises or consists of polyethylene glycol diacrylate (PEGDA) and 2-hydroxy-2-methylpropiophenone (2-HMP). In some embodiments, the optical fiber 110 comprises a biocompatible material, such as PEDGA and/or 2-HMP, and a low refractive index material, such as calcium alginate, surrounding the biocompatible core as biocompatible cladding.

Additional examples of polymeric materials that can be included in the optical fibers 110 or used to form the optical fibers 110 and/or biocompatible cladding include, without limitation, natural or synthetic monomers, polymers, and copolymers, as well as biocompatible monomers, polymers, and copolymers. For example, in some embodiments, the optical fibers 110 and biocompatible cladding can include one or more of the following: polystyrene, neoprene, polyetheretherketone (PEEK), carbon reinforced PEEK, polyphenylene, polyetherketoneketone (PEKK), polyaryletherketone (PAEK), polyphenylsulphone, polysulphone, polyurethane, polyethylene, low-density polyethylene (LDPE), linear low-density polyethylene (LLDPE), high-density polyethylene (HDPE), polypropylene, polyetherketoneetherketoneketone (PEKEKK), nylon, fluoropolymers such as polytetrafluoroethylene (PTFE or TEFLON®), TEFLON® TFE (tetrafluoroethylene), polyethylene terephthalate (PET or PETE), TEFLON® FEP (fluorinated ethylene propylene), TEFLON® PFA (perfluoroalkoxy alkane), and/or polymethylpentene (PMP), styrene maleic anhydride, styrene maleic acid (SMA), polyurethane, silicone, polymethyl methacrylate, polyacrylonitrile, poly (carbonate-urethane), poly(amylacetate), nitrocellulose, cellulose acetate, urethane, urethane/carbonate, polylactic acid, polyacrylamide (PAAM), poly(N-isopropylacrylamide)(PNIPAM), poly (vinylmethylether), poly(ethylene oxide), poly(ethyl (hydroxyethyl) cellulose), poly(2-ethyl oxazoline), polylactide (PLA), polyglycolide (PGA), poly(lactide-co-glycolide) PLGA, poly(ε-caprolactone), polydiaoxanone, polyanhydride, trimethylene carbonate, poly(hydroxybutyrate), poly (ethyl glutamate), poly(DTH-iminocarbonate), poly(bisphenol A iminocarbonate), poly(orthoester) (POE), polycyanoacrylate (PCA), polyphosphazene, polyethyleneoxide (PEO), polyethylene glycol (PEG) or any of its derivatives, polyacrylacid (PAA), polyacrylonitrile (PAN), polyvinylacrylate (PVA), polyvinylpyrrolidone (PVP), polyglycolic lactic acid (PGLA), poly(hydroxypropylmethacrylamide) (PHPMAm), polyvinyl alcohol (PVOH), PEG diacrylate (PEGDA), poly(hydroxyethyl methacrylate) (PHEMA), N-isopropylacrylamide (NIPA), polyoxazoline (POx), poly(vinyl alcohol)-poly(acrylic acid) (PVOH-PAA), collagen, silk, fibrin, gelatin, hyaluron, cellulose, chitin, dextran, casein, albumin, ovalbumin, heparin sulfate, starch, agar, heparin, alginate, fibronectin, fibrin, keratin, pectin, elastin, ethylene vinyl acetate, ethylene vinyl alcohol (EVOH), polyethylene oxide, PLLA (poly(L-lactide) or poly (L-lactic acid)), poly(D,L-lactic acid), poly(D,L-lactide), polydimethylsiloxane (PDMS), poly(isopropyl acrylate) (PIPA), polyethylene vinyl acetate (PEVA), PEG styrene, polytetrafluoroethylene RFE such as TEFLON® RFE or KRYTOX® RFE, fluorinated polyethylene (FLPE or NALGENE®), methyl palmitate, poly(N-isopropylacrylamide) (NIPA), polycarbonate, polyethersulfone, polycaprolactone, polymethyl methacrylate, polyisobutylene, nitrocellulose, medical grade silicone, cellulose acetate, cellulose acetate butyrate, polyacrylonitrile, poly(lactide-co-caprolactone) (PLCL), and/or chitosan.

The dimensions of the optical fibers 110 can vary widely and thus are not particularly limited. For example, the diameter of the optical fiber 110 can vary from a few micrometers up to sizes on the scale of millimeters, with the lengths capable of being similar in scale or even larger. In some embodiments, for example, the diameter of the optical fiber 110 is about 500 microns. In some embodiments, the diameter of the optical fiber 110 is about 950 microns and about 5 cm in light. In some embodiments, the diameter of the optical fiber 110 is about 1 mm. These shall not be limiting as other dimensions can be utilized herein without departing from the scope of the present invention.

As described above, the sensor component 120 includes an array of light diffusing microstructures. In some embodiments, the array 124 of light diffusing microstructures includes a plurality of microlenses. For example, in some embodiments, the light diffusing microstructures and/or the plurality of microlenses form an asymmetric microlens array 124. At least one advantage of the asymmetric microlens array 124 is that it can increase the active area of the sensor component 120 and enhance the diffusion rate of the analyte into the a polymeric and/or hydrogel matrix, thereby shortening response times and/or improving sensitivity, among other things. In some embodiments, an asymmetric microlens array 124 can refer to a microlens array including a plurality of microlenses and having at least one aspect which is nonuniform, or asymmetric. For example, the term includes microlens arrays having at least two microlenses which are different from each other in at least one aspect. The aspect(s) in which the microlens array and/or microlenses are nonuniform (e.g., different, asymmetric, etc.) is not particularly limited and can include, for example and without limitation, the distribution and/or arrangement of microlenses, the spacing between microlenses, as well as the size, shape, and/or surface topology of the microlenses.

For example, in some embodiments, the asymmetric microlens array 124 includes microlenses which are non-uniformly spaced apart. In some embodiments, the asymmetric microlens array 124 includes microlenses which are arranged in a nonordered distribution. In some embodiments, the asymmetric microlens array 124 includes microlenses which are arranged in a nonperiod configuration. In some embodiments, the asymmetric microlens array 124 includes microlenses, or at least two microlenses, which differ in at least one base dimension (e.g., length, width, diameter, etc.). In some embodiments, the asymmetric microlens array 124 includes microlenses, or at least two microlenses, which differ in base geometry (e.g., shape). In some embodiments, the asymmetric microlens array 124 includes microlenses, or at least two microlenses, which differ in height. In some embodiments, the asymmetric microlens array 124 includes microlenses, or at least two microlenses, which have different side profiles (e.g., cross-sectional shape). In some embodiments, the asymmetric microlens array 124 includes microlenses, or at least two microlenses, which differ in surface topology.

In some embodiments, the asymmetric microlens arrays 124 can include microlenses having other features. In some embodiments, the asymmetric microlens array 124 includes one or more microlenses, wherein each of the one or more microlenses can independently have an aspherical or spherical surface. For example, in some embodiments, the asymmetric microlens array 124 includes at least one microlense having an aspherical surface. In some embodiments, the asymmetric microlens array 124 includes at least one microlense having a spherical surface.

In some embodiments, each microlense and/or its surface can be concave, convex, plano-concave, plano-convex, convex-concave, and/or concave-convex, where convex means outwardly facing, for example, away from the optical fiber. In some embodiments, the asymmetric microlens array 124 includes at least one microlense having a convex aspherical surface. In some embodiments, the asymmetric microlens array 124 includes at least one microlense having a plano-convex aspherical surface. In some embodiments, the asymmetric microlens array 124 includes at least one microlense having a convex-concave aspherical surface. In some embodiments, the asymmetric microlens array 124 includes at least one microlense having a convex-concave aspherical surface. In some embodiments, the asymmetric microlens array 124 includes at least one microlense having a convex spherical surface. In some embodiments, the asymmetric microlens array 124 includes at least one microlense having a plano-convex spherical surface. In some embodiments the asymmetric microlens array 124 includes at least one microlense having a convex-concave spherical surface. In some embodiments, the asymmetric microlens array 124 includes at least one microlense having a convex-concave spherical surface.

In some embodiments, the asymmetric microlens array 124 includes at least one microlense having a concave aspherical surface. In some embodiments, the asymmetric microlens array 124 includes at least one microlense having a plano-concave aspherical surface. In some embodiments, the asymmetric microlens array 124 includes at least one microlense having a concave-convex aspherical surface. In some embodiments, the asymmetric microlens array 124 includes at least one microlense having a concave-convex aspherical surface. In some embodiments, the asymmetric microlens array 124 includes at least one microlense having a concave spherical surface. In some embodiments, the asymmetric microlens array 124 includes at least one microlense having a plano-concave spherical surface. In some embodiments the asymmetric microlens array 124 includes at least one microlense having a concave-convex spherical surface. In some embodiments, the asymmetric microlens array 124 includes at least one microlense having a concave-convex spherical surface.

In some embodiments, the asymmetric microlens array 124 includes one or more conical-shaped microlenses. In some embodiments, the asymmetric microlens array 124 includes one or more hemispherical-shaped microlenses. In some embodiments, the asymmetric microlens array 124 includes one or more aspherical-shaped microlenses. In some embodiments, the asymmetric microlens array 124 includes one or more cylindrical-shaped microlenses. In some embodiments, the asymmetric microlens array 124 includes hyperbolic-shaped microlenses. In some embodiments, the asymmetric microlens array 124 includes one or more of micro-spheres, micro-pikes, micro-pyramids, micro-grooves, micro-cones, micro-peaks, micro-blocks, among others. In some embodiments, the asymmetric microlens array 124 includes any one or more of the foregoing and other features disclosed elsewhere herein.

The light diffusing microstructures and, in particular, the asymmetric microlens arrays 124 can be imprinted on a stimuli-responsive polymeric material 122 to form the sensor component 120. Exemplary stimuli-responsive polymeric materials 122 include light-curable stimuli-responsive hydrogels which can be imprinted with an asymmetric microlens array 124 to form hydrogel sensors 120. Other polymeric materials which can undergo a change in at least one property in response to at least one stimulus can also be utilized herein as the stimuli-responsive polymeric material 122. Suitable polymeric materials include, for example and without limitation, natural or synthetic polymers (e.g., hydrogels, homopolymers, copolymers, terpolymers, polymer blends, etc.), oligomers, monomers, and the like, such as those described above in relation to the optical fibers. The change can include physical changes, chemical changes, or both physical changes and chemical changes. For example, the changes can include a change from hydrophilic to hydrophobic (and vice versa), changes in color and/or transparency, changes in conductivity, changes in permeability, changes in shape, as well as reversible conformational changes and/or physico-chemical changes, such as folding/unfolding transitions, reversible precipitation behavior, or other conformational changes. The at least one stimulus can include at least one of temperature, pH, pressure, wavelength of light, ionic strength, ion concentration, analyte concentration, electric field, magnetic field, solvent, and the like. Examples of stimuli-responsive polymeric materials include, without limitation, temperature-responsive polymers, pH-responsive polymers, light-responsive polymers, ion-responsive polymers, analyte-responsive polymers (e.g., for sensing oxygen, carbon dioxide, glucose, etc.), and the like. Additional examples of polymers include, without limitation, block copolymers and graft copolymers having one or more stimuli-responsive polymer components. For example, a stimuli-responsive block copolymer can include a temperature-sensitive polymer block. A stimuli-responsive graft copolymer can include a pH-responsive polymer backbone or pendant temperature-sensitive polymer components. the stimuli-responsive polymeric materials can in addition or in the alternative include any of the polymeric materials disclosed above in the discussion regarding the optical fibers.

Figure 1B:
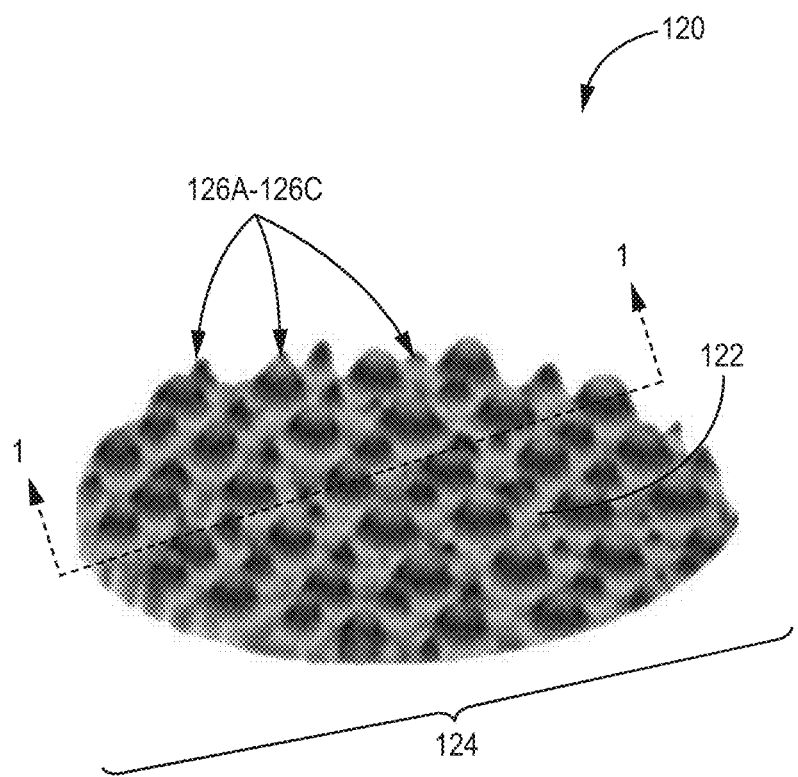
FIG. 1B is a schematic diagram of an asymmetric microlens array imprinted on a stimuli-responsive hydrogel in accordance with one or more embodiments of the invention.
Figure 1C:
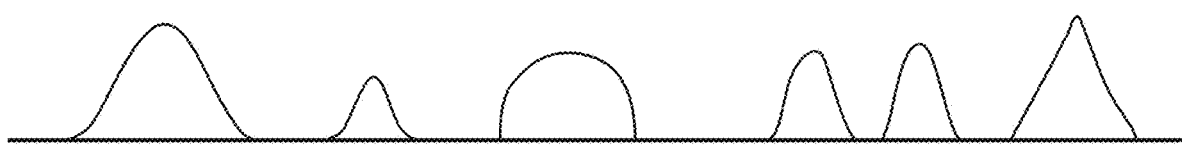
FIG. 1C is a schematic diagram showing the side profile of a microlens array taken along line 1-1 in accordance with one or more embodiments of the invention.
Figure 2A:
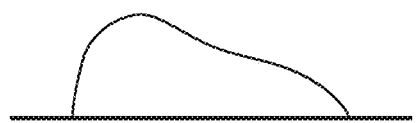
FIGS. 2A-2J are schematic diagrams showing the side profile of various micro lenses in accordance with one or more embodiments of the invention.
Figure 2F:
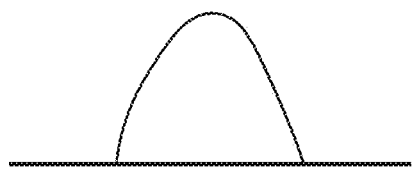
Figure 2B:
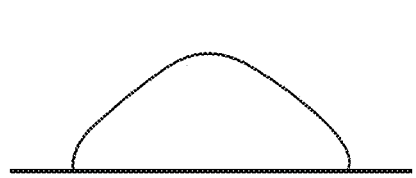
Figure 2G:
Figure 2C:
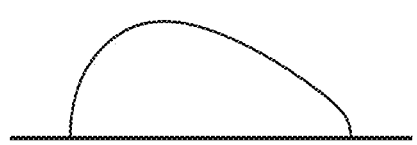
Figure 2H:
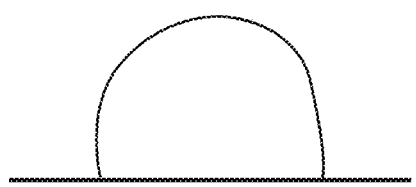
Figure 2D:
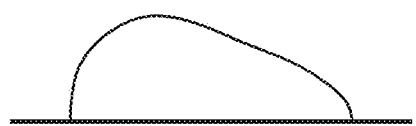
Figure 2I:
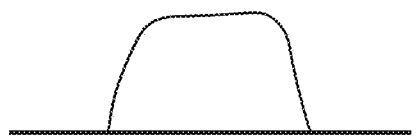
Figure 2E:
Figure 2J:

Referring now to FIG. 1B, an isometric view of the sensor component 120 is provided to illustrate the asymmetric microlens array 124 in more detail, according to one or more embodiments of the invention. In the illustrated embodiment, the asymmetric microlens array 124 is imprinted on a stimuli-responsive hydrogel 122 and includes a plurality of convex aspherical microlenses, such as convex aspherical microlenses 126A, 126B, 126C. The plurality of convex aspherical microlenses forming the asymmetric microlens array 124 are arranged in a nonordered, nonperiodic configuration, with nonuniform spacing between adjacent microlenses. Further, the plurality of convex aspherical microlenses have nonuniform base dimensions, nonuniform base geometries, and nonuniform heights. In addition, the plurality of convex microlenses have nonuniform surface topologies and side profiles. FIG. 1C is a side profile view of a portion of the asymmetric microlens array 120 taken long the line 1-1, illustrating various nonuniform shapes, side profiles, heights, base dimensions, spacing between microlenses, and surface topologies of microlenses, according to one or more embodiments of the invention. While the microlenses shown in FIG. 1C include plano-convex microlenses, other configurations are possible and thus shall not be limiting.

Referring now to FIGS. 2A-2J, side profile views of generally plano-convex aspherical microlenses are shown to illustrate the variation among the microlenses in terms of shapes and surface topologies, according to one or more embodiments of the invention. One or more of the aspherical microlenses shown in FIGS. 2A-2J can be imprinted on a stimuli-responsive polymeric material. The side profile views presented in FIGS. 2A-2J are nonlimiting. Microlenses can have side profiles other than those presented in FIGS. 2A-2J. The side profile views shown in those figures were presented to illustrate the variations and diversity of shapes and surface topologies of microlenses which can be utilized herein.

Figure 3:
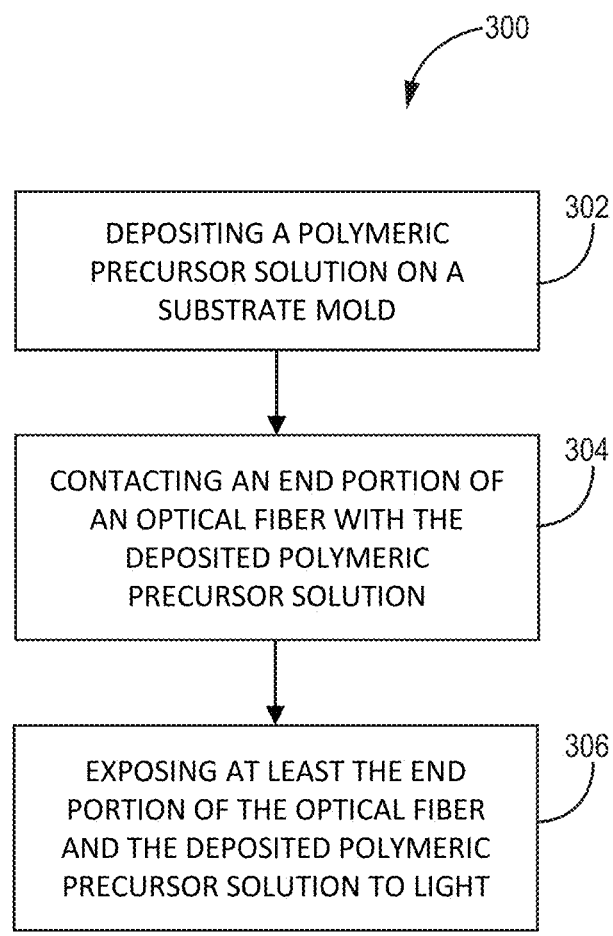
FIG. 3 is a flowchart of a method of fabricating a fiber optic probe in accordance with one or more embodiments of the invention.

Referring now to FIG. 3, a flowchart of a method of fabricating a fiber optic probe is shown, according to one or more embodiments of the invention. As shown in FIG. 3, the method 300 of fabricating a fiber optic probe can comprise one or more of the following steps: depositing 302 a polymeric precursor solution on a substrate mold; contacting 304 an end portion of an optical fiber with the deposited polymeric precursor solution; and exposing 306 at least the end portion of the optical fiber and the deposited polymeric precursor solution to light. At least one advantage of the present method, among others, is that the sensor component can be synthesized (e.g., a hydrogel can be synthesized and/or crosslinked), imprinted with light diffusing microstructures (e.g., an asymmetric microlens array), and attached to the end portion of the optical fiber in a single step, such as step 306. Other advantages are or will become apparent from the discussion below and elsewhere herein.

In step 302, a polymeric precursor solution is deposited on a surface of a substrate mold. The surface of the substrate mold can be stamped or imprinted with the inverse structure of the desired asymmetric microlens array. For example, in embodiments in which the stimuli-responsive polymeric material is to be imprinted with an asymmetric microlens array that includes a plurality of convex microlenses, the surface of the substrate mold will include a plurality of concave microlenses. The inverse structure is used so that the resulting stimuli-responsive polymeric material has the desired topology once it is peeled or released from the substrate mold. Conversely, the structure can be imprinted with a plurality of convex microlenses if the stimuli-responsive polymeric material is to be imprinted with an asymmetric microlens array that includes a plurality of convex microlenses. Accordingly, in some embodiments, the substrate mold has a surface including an inverse asymmetric microlens array.

Since the polymeric precursor solution, once polymerized, will form the stimuli-responsive polymeric material of the sensor component, the volume or amount of the polymeric precursor solution to be deposited on the substrate surface can depend on the size (e.g., the diameter) of the optical fiber. For example, the volume of polymeric precursor solution to be deposited on the surface of the substrate mold should be sufficient to form a stimuli-responsive polymeric material that at least partially covers, or preferably, substantially or completely covers, the end or end portion of the optical fiber. Usually, an appropriate volume of the polymeric precursor to be deposited is one that is sufficient to cover the portion of substrate mold that forms the asymmetric microlens array. Since the such volumes are usually not relatively large volumes, the depositing can be performed by pipetting or drop-casting the polymeric precursor solution onto the substrate surface, although other similar techniques, like coating, can be used. In addition, the volume or amount of the polymeric precursor solution to be deposited can be adjusted to achieve a desired thickness of the stimuli-responsive polymeric material following polymerization. As an example, in some embodiments, about 20 μL of the polymeric precursor solution is deposited on the surface of the substrate mold.

As discussed above, the polymeric precursor solution includes precursors that can be polymerized, crosslinked, and/or cured to form the stimuli-responsive polymeric material. While any of the polymeric materials disclosed herein and/or its precursors can be used, in some embodiments, the polymeric precursor solution includes precursors for light-curable stimuli-responsive hydrogels, preferably UV-curable stimuli-responsive hydrogels. For example, the polymeric precursor solution can include a light-curable stimuli-responsive hydrogel precursor solution that includes one or more of the following: at least one monomer, at least one photoinitiator, at least one crosslinking agent, and at least one functionalizing agent. Additional examples of components that can be included in the precursor solution include, without limitation, oligomers, macromers, prepolymers, coinitiators, stabilizers, and plasticizers, among others. In some embodiments, these precursors can be exposed to ultraviolet light to synthesize ultraviolet light-curable (or UV-curable) stimuli-responsive hydrogels. In other embodiments, precursors which are curable or crosslinked by other means—such as X-rays, microwaves, γ-radiation, thermal treatments, and the like—can be utilized herein without departing from the scope of the present invention. In addition, other additives, such as pH adjusting agents, solvents, and wetting agents, can optionally be further included in the polymeric precursor solution.

In some embodiments, the polymeric precursor solution is a hydrogel precursor solution that can be implemented herein to form UV-curable stimuli-responsive hydrogels. In some embodiments, the UV-curable stimuli-responsive hydrogel includes a glucose-responsive hydrogel that can be used for glucose sensing. For example, in some embodiments, the hydrogel precursor solution includes acrylamide; N,N'-methylenebisacrylamide; 3-(acrylamido)-phenylboronic acid (3-APBA); and 2,2-dimethoxy-2-2phenylacetophenone (DMPA). In some embodiments, the UV-curable stimuli-responsive hydrogel includes an alcohol-responsive hydrogel that can be used for alcohol sensing. For example, in some embodiments, the hydrogel precursor solution includes 2-hydroxyethylmethacrylate (HEMA); ethylene glycol dimethacrylate (EGDMA); and 2,2-dimethoxy-2-phenylacetophenone (DMPA). In some embodiments, the UV-curable stimuli-responsive hydrogel includes an alcohol-responsive hydrogel that can be used for pH sensing. For example, in some embodiments, the hydrogel precursor solution includes 2-hydroxyethylmethacrylate (HEMA); ethylene glycol dimethacrylate (EGDMA); acrylic acid (AA); and 2,2-dimethoxy-2-phenylacetophenone (DMPA). In some embodiments, the hydrogel precursor solution further includes 2-(dimethylamino) ethyl methacrylate.

Other hydrogel precursor solutions can be used herein without departing from the scope of the present invention.

For example, in some embodiments, the hydrogel precursor solution includes monomers and/or prepolymers of polyvinyl alcohol, polyvinyl pyrrolidone, a polyvinyl pyrrolidone/vinyl acetate copolymer, a vinyl ether/anhydric maleic acid copolymer, an isobutylene/anhydric maleic acid copolymer, a methoxyethylene/anhydric maleic acid copolymer, a methacrylic acid/butyl acrylate copolymer, alginate, hydroxyethyl methacrylate, hydroxyethyl cellulose, hydroxypropyl cellulose, hydroxypropyl methylcellulose, ethyl cellulose, methyl cellulose, sodium carboxymethyl cellulose, dextrans, polysaccharides, a carboxyvinyl copolymer, polyethylene oxide, polyethylene glycol, polyacrylamide, polyhydroxyethyl methacrylate, polydioxolane, polyacrylic acid, sodium polyacrylate, polyvinyl acrylate, polyacryl acetate, polyacrylamide, poly-N-vinyl pyrrolidinone, agarose, and polyvinyl chloride.

In some embodiments, the hydrogel precursor solution includes one or more of the following, optionally as photoinitiators (e.g., ultraviolet initiators): phenylacetophenone, 2,2-dimethoxy-2-phenylacetophenone (DMPA), hydroxy dimethyl acetophenone, 4,4'-bis(dimethylamino)benzyl, methylbenzoylformate, diphenyl (2,4,6-trimethylbenzoyl)-phosphine oxide, phenyl bis(2,4,6-trimethyl benzoyl), oxyphenyl-acetic acid-2-[2-oxo-2-phenyl-acetoxy-ethoxy]-ethyl ester, oxy-phenyl-acetic acid-2-[2-hydroxy-ethoxy]-ethyl ester, 4-cyclopentadiene-1-yl) bis [2,6-difluoro-3-(1-H-pyrrole-1-yl)phenyl] titanium, 2-acetylnaphthalene, 2-naphthalaldehyde, iodonium salt, dicyclic acid derivatives, 9.10-anthraquinone, anthracene, pyrene, aminopyrene, perylene, phenanthrene, phenanthrenequinone, 9-fluorenone, dibenzosuberone, curcumin, xanthone, thiomichler's ketone, 2,5-bis(4-diethylaminobenzyllidene) cyclopentanone, 2-(4-dimethylamino-benzyllidene))-indan-1-one, α-(4-dimethylaminobenzyllidene))ketone such as 3-(4-dimethylamino-phenyl)-1-indan-5-yl-propenone, 3-phenylthiophthalimide, N-methyl-3,5-di(ethylthio)-phthalimide, N-methyl-3,5-dnethylthio)-phthalimide, phenothiazine, methylphenothiazine, N-phenylglycine, amines such as triethanolamine and N-methyldiethanolamine, ethyl-p-dimethylaminobenzoate, 2-(dimethylamino)ethylbenzoate, 2-ethylhexyl-p-dimethylaminobenzoate, octyl-para-N, N-dimethylaminobenzoate, N-(2-hydroxyethyl)-N-methyl-para-toluidine, butoxyethyl 4-dimethylaminobenzoate, 4-dimethyl aminoacetophenone, triethanolamine, methyl di ethanol amine, dimethylaminoethanol, 2-(dimethylamino) ethyl benzoate, poly(propylene glycol)-4-(dimethylamino) benzoate, michler's ketone, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

In some embodiments, the hydrogel precursor solution includes one or more of the following, optionally as photoinitiators (e.g., ultraviolet initiators): benzophenone, 4-phenyl benzophenone, 4-methoxy benzophenone, 4,4'-dimethyl benzophenone, 4,4'-dichlorobenzophenone, 4,4'-bis(dimethylamino)-benzophenone, 4,4'-bis(diethylamino) benzophenone, 4,4'-bis(methylethylamino)benzophenone, 4,4'-bis(p-isopropylphenoxy)benzophenone, 3,3'-dimethyl-4-methoxy benzophenone, methyl-2-benzoylbenzoate, 4-(2-hydroxyethylthio)-benzophenone, 4-(4-tolylthio)benzophenone, 1-[→4-(4-benzoyl-phenylsulfanyl)-phenyl]-2-methyl-2 (toluene-4-sulfonyl)-propane-1-one, 4-benzoyl-N, N,N-trimethylbenzenemethanaminium chloride, 2-hydroxy-3-(4-benzoyl-phenoxy)-N,N,N-trimethyl-1-propaneaminium chloride monohydrate, 4-(13-acryloyl-1,4, 7,10,13-pentaoxatridecyl)-benzophenone, and 4-benzoyl-N, N-dimethyl-N-[2-(1-oxo-2-prophenyl)oxy]ethyl-benzenemethanaminium chloride.

In some embodiments, the hydrogel precursor solution includes one or more of the following, optionally as cross-linking agents: ethylene glycol dimethacrylate (EGDMA), benzyl methacrylate, lauryl methacrylate, isodecyl methacrylate, phenoxy methacrylate, 2-hydroxyethyl methacrylate, tetrahydro furfuryl methacrylate, cetyl(C16) methacrylate, stearyl methacrylate, methoxyPEG500 methacrylate, methoxyPEG600 methacrylate, methoxyPEG1000 methacrylate, 1,6-hexandiol dimethacrylate, butadiene dimethacrylate, neopentylglycol dimethacrylate, ethyleneglycoldimethacrylate, diethyleneglycol dimethacrylate, triethyleneglycol dimethacrylate, tetraethyleneglycol dimethacrylate, bisphenol A(EO)4 dimethacrylate, bisphenol A(EO)3 dimethacrylate, bisphenol A(EO)10 dimethacrylate, bisphenol A(EO)30 dimethacrylate, 1,3-butyleneglycol dimethacrylate, polyethylene glycol 400 dimethacrylate, polyethylene glycol 200 dimethacrylate, PPG1000(EO)15 dimethacrylate, PPG1000(EO)3 dimethacrylate, trimethylolpropane trimethacrylate, benzyl acrylate, lauryl acrylate, isodecyl acrylate, phenol(EO) acrylate, phenol(EO)2 acrylate, phenol(EO)4 acrylate, phenol(EO)6 acrylate, tetrahydro furfuryl acrylate, nonyl phenol(EO)4 acrylate, nonyl phenol(EO)8 acrylate, nonyl phenol(EO)2 acrylate, ethoxyethoxy ethyl acrylate, stearyl acrylate, 1,6-hexandiol diacrylate, 1,6-hexandiol(EO) diacrylate, butanediol diacrylate, hydroxy pivalic acid neopentyl glycol diacrylate, tripropylene glycol diacrylate, dipropylene glycol diacrylate, bisphenol A(EO)4 diacrylate, bisphenol A(EO)3 diacrylate, tricyclodecane dimethanol diacrylate, tetraethylene glycol diacrylate, polyethylene glycol 400 diacrylate, polyethylene glycol 200 diacrylate, polyethylene glycol 300 diacrylate, polyethylene glycol 600 diacrylate, polypropylene glycol 400 diacrylate, polypropylene glycol 750 diacrylate, bisphenol A(EO)10 diacrylate, bisphenol A(EO)30 diacrylate, tris (2-hydroxy ethyl)isocyanurate diacrylate, trimethylolpropane triacrylate, trimethylolpropane(EO)3 triacrylate, trimethylolpropane(EO)6 triacrylate, trimethylolpropane (EO)9 triacrylate, trimethylolpropane(EO)15 triacrylate, glycerin propoxylated triacrylate, pentaerythritol triacrylate, trimethylolpropane(PO)3 triacrylate, tris(2-hydroxy ethyl) isocyanurate triacrylate, pentaerythritol n-EO tetraacrylate, pentaerythritol tetraacrylate, dipentaerythritol pentaacrylate, dipentaerythritol hexaacrylate, caprolactone acrylate, O-phenylphenol EO acrylate, and methylene bisacrylamide.

In some embodiments, the hydrogel precursor solution includes one or more of the following, optionally as functionalizing agents and molecular recognition agents: phenylboronic acids and derivatives thereof, aptamers including oligonucleotides and peptide molecules, and other chelating agents for sensing a wide range of analytes, including biomolecules such as proteins, DNR, and RNA. Non-limiting examples of such functionalizing agents include, without limitation, 3-(acrylamido)-phenylboronic acid (3-APBA), 3-aminophenylboronic acid, 5-amino-2-fluorophenylboronic acid, 4-amino-3-fluorophenylboronic acid, peptides, antibodies, concanavalin A, glucose oxidase, glucose dehydrogenase, hexokinase, glucose/galactose-binding protein, a protein and/or a fragment functionally equivalent to a protein, a mutant of hexokinase, a mutant of glucose/galactose-binding protein, a borate ester derivative, and the like.

In some embodiments, the sensitivity and/or response time of the hydrogel sensor and thus of the fiber optic probe can be modulated by varying at least one of the following: the content of the crosslinking agent (e.g., to tune the elasticity of the resulting hydrogel sensor), the content of at least one monomer (e.g., to tune selectively the sensing range), and the content of the at least one photoinitiator. For example, the amount of the crosslinking agent included in the hydrogel precursor solution can range from greater than 0% by weight to about 80% by weight, or any incremental value or subrange between that range. In some embodiments, the amount of the monomer included in the hydrogel precursor solution can range from about 0 to about 80% by weight, or any incremental value or subrange between that range. In some embodiments, the amount of photoinitiator included in the hydrogel precursor solution can range from about 0% to about 80% by weight, or any incremental value or subrange between that range. Unless otherwise provided, all percentages by weight are based on the total weight of the solution. In some embodiments, the sensitivity and/or responsive time of the hydrogel sensor can be modulated by including an additional monomer to form a copolymer.

In step (b), an end portion of the optical fiber is contacted with the deposited polymeric precursor solution. For example, in some embodiments, an end portion of an optical fiber is contacted with a light-curable stimuli-responsive hydrogel precursor solution deposited on the substrate mold. The contacting can be performed by bringing the end portion of the optical fiber and at least a portion of the deposited polymeric precursor solution into physical contact, or immediate or close proximity. The contacting should be sufficient to permit attachment of the hydrogel sensor to the end of the optical fiber following step (c). Any of the optical fibers of the present disclosure can be utilized herein. For example, in some embodiments, the optical fiber is a biocompatible fiber. In some embodiments, the optical fiber is a UV-curable biocompatible fiber formed in accordance with the methods disclosed herein as described in more detail below. In some embodiments, the end portion of the optical fiber is silanized prior to being contacted with the deposited polymeric precursor solution. The silanized end of the optical fiber can be used to form covalent bonds between the optical fiber and the stimuli-responsive hydrogel. In some embodiments, crosslinking agents are utilized to attach the stimuli-responsive hydrogel and the optical fiber.

In step (c), the end portion of the optical fiber and the deposited polymeric precursor solution are exposed to light. Any wavelength of light suitable for carrying out the polymerization can be utilized herein. For example, in some embodiments, the end portion of the optical fiber and the deposited polymeric precursor solution are exposed to ultraviolet light. The duration of the exposure to light generally and in particular to ultraviolet light is not particularly limited. For example, in some embodiments, the exposure duration or cure duration is about 5 minutes. In some embodiments, the exposure duration or cure duration is about 60 minutes. In some embodiments, the exposure duration or cure duration is at least about 5 or about 15 seconds or longer. Other wavelengths of light can be utilized herein. For example, in some embodiments, the wavelengths of light used for curing include, without limitation, gamma-radiation, X-rays, microwaves, etc. Alternatively, in some embodiments, the end portion of the optical fiber and the deposited polymeric precursor solution can be exposed to a heat treatment, among other treatments, to carry out the polymerization.

As described above, the surface of the substrate mold can include the inverse structure of the asymmetric microlens array that is to be imprinted on the stimuli-responsive polymeric material and used as the sensor component of the fiber optic probe. For example, in some embodiments, the substrate mold has a surface including an inverse asymmetric microlens array. In some embodiments, the substrate mold is replica diffuser, wherein the inverse structure of the asymmetric microlens array formed on the surface of the substrate mold is replica molded from a master light diffuser.

Figure 4:
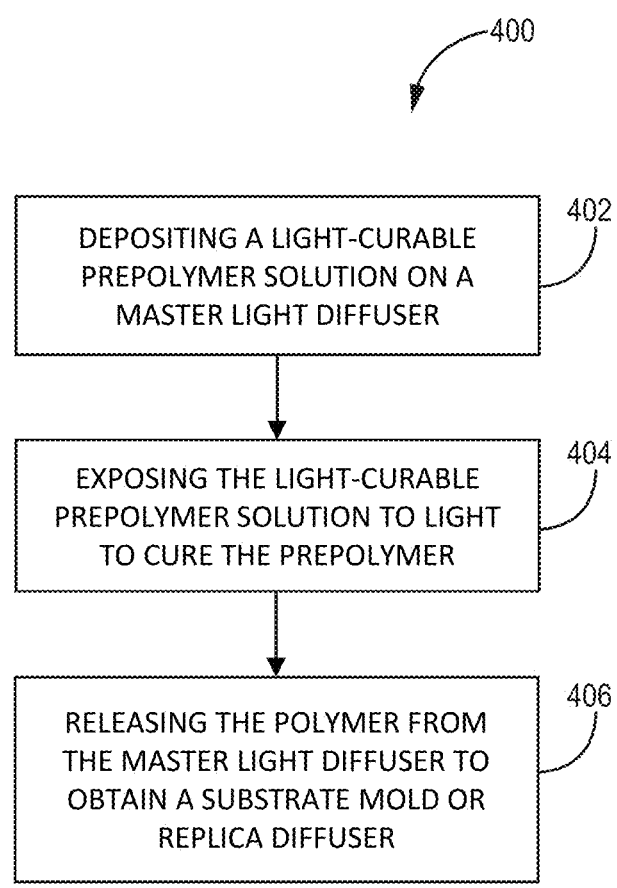
FIG. 4 is a flowchart of a method of fabricating a substrate mold from a master light diffuser in accordance with one or more embodiments of the invention.

For example, FIG. 4 is a flowchart of a method of fabricating a replica diffuser (e.g., the substrate mold) from a master light diffuser, according to one or more embodiments of the invention. As shown in FIG. 4, the method can comprise depositing 402 a light curable prepolymer solution on a master light diffuser. The master light diffuser can include a master asymmetric microlens array, which can be used as a template or mold to form the inverse asymmetric microlens array on the substrate mold. The depositing can be performed by drop-casting, pipetting, or coating the light curable prepolymer solution on the master light diffuser. The light curable prepolymer solution can include one or more of oligomers, monomers, photoinitiators, coinitiators, crosslinking agents, stabilizers, and plasticizers, including any of those disclosed herein. Usually, the prepolymer solution should be selected such that the resulting polymer is one which can be used as a replica diffuser without adverse interactions with the stimuli-responsive polymeric material. For example, the prepolymer solution should be selected such that, when the replica diffuser is used to imprint an asymmetric microlens array on a stimuli-responsive polymeric material, the resulting sensor component can be released or peeled from the replica diffuser without causing any damage thereto. This can be achieved by selecting materials which will not strongly bind or irreversibly bind with stimuli-responsive polymeric materials (e.g., by selecting materials that do not bind or at least reversibly bind with materials used to form the sensor component). In some embodiments, the light curable prepolymer solution is ultraviolet light curable. For example, UV curable acrylics, such acrylated epoxies, acrylated polyesters, acrylated urethanes, acrylated silicones, and the like, can be utilized herein. Other light curable polymeric materials can be used, including those described elsewhere herein. In step 404, the light curable prepolymer solution is exposed to light to cure the prepolymer (e.g., cause polymerization therein). In step 406, the cured polymer is released or peeled from the master light diffuser to obtain the substrate mold (or replica diffuser) including the inverse asymmetric microlens array. In some embodiments, the releasing or peeling in step 406 can involve the use of a solvent. In some embodiments, mechanical separation is sufficient to separate the substrate mold from the master light diffuser.

Figure 5:
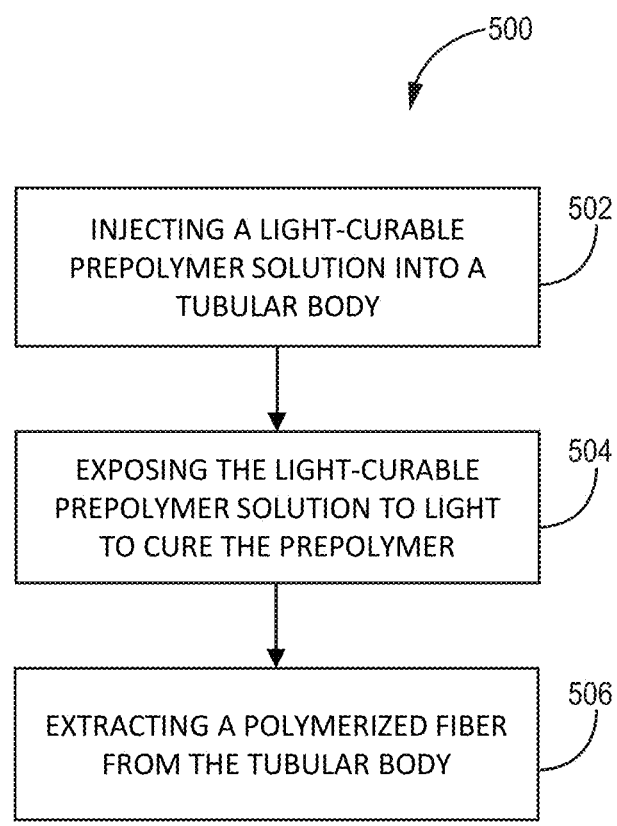
FIG. 5 is a flowchart of a method of fabricating an optical fiber in accordance with one or more embodiments of the invention.

Referring now to FIG. 5, a flowchart of a method of fabricating an optical fiber is provided, according to one or more embodiments of the invention. As shown in FIG. 5, the method 500 can comprise injecting 502 a light curable prepolymer solution into a tubular body; exposing 504 the light curable prepolymer solution to light to cure the prepolymer (e.g., to cause polymerization therein); and extracting 506 a polymerized optical fiber from the tubular body. Any of the light curable polymeric materials and precursors of light curable polymers of the present disclosure can be utilized herein. In some embodiments, precursors of ultraviolet light curable polymers are injected into the tubular body. In some embodiments, the light curable prepolymer solution includes prepolymers or precursors of an ultraviolet light curable polymer that is biocompatible and thus form biocompatible optical fibers. For example, in some embodiments, the optical fiber is a biocompatible hydrogel fiber. In some embodiments, the optical fiber is a biocompatible polymeric fiber. In some embodiments, the polymerized optical fiber is extracted in step 506 by applying water pressure. In some embodiments, the polymerized optical fiber is extracted in step 506 by applying air pressure. Other gases and liquids can be utilized herein for extracting the polymerized optical fiber and thus these examples shall not be limiting. In some embodiments, the method 500 further comprising forming one or more layers surrounding the polymerized optical fiber. For example, in some embodiments, the layer has a lower refractive index than the polymerized optical fiber and thus can be used as cladding.

Referring now to FIG. 6, a schematic diagram of a system 600 configured for operation in transmission mode is shown, according to one or more embodiments of the invention. In the illustrated embodiment, the system 600 includes a fiber optic probe 602. A proximal end 604 of the fiber optic probe 602 is coupled to a light source 608 which can be configured to transmit either monochromatic light or broadband light through the fiber optic probe 602. A distal end portion 606 of the fiber optic probe 602 includes a sensor component 610 which as described above includes an asymmetric microlens array imprinted on a stimuli-responsive polymer. A light detector 612 is disposed proximally to the distal end portion 606 of the fiber optic probe 602 such that at least a portion of the light transmitted from the asymmetric microlens array is incident upon the light sensor 612. Advantageously, an optical power meter or a smartphone can be used as the light sensor 612. During operation, the distal end portion 606 of the fiber optic probe 602 comprising the sensor component 610 can be exposed to an environment 614 and the maximum optical transmitted power recorded by the light sensor 612 can be correlated to the property being sensed.

Figure 7:
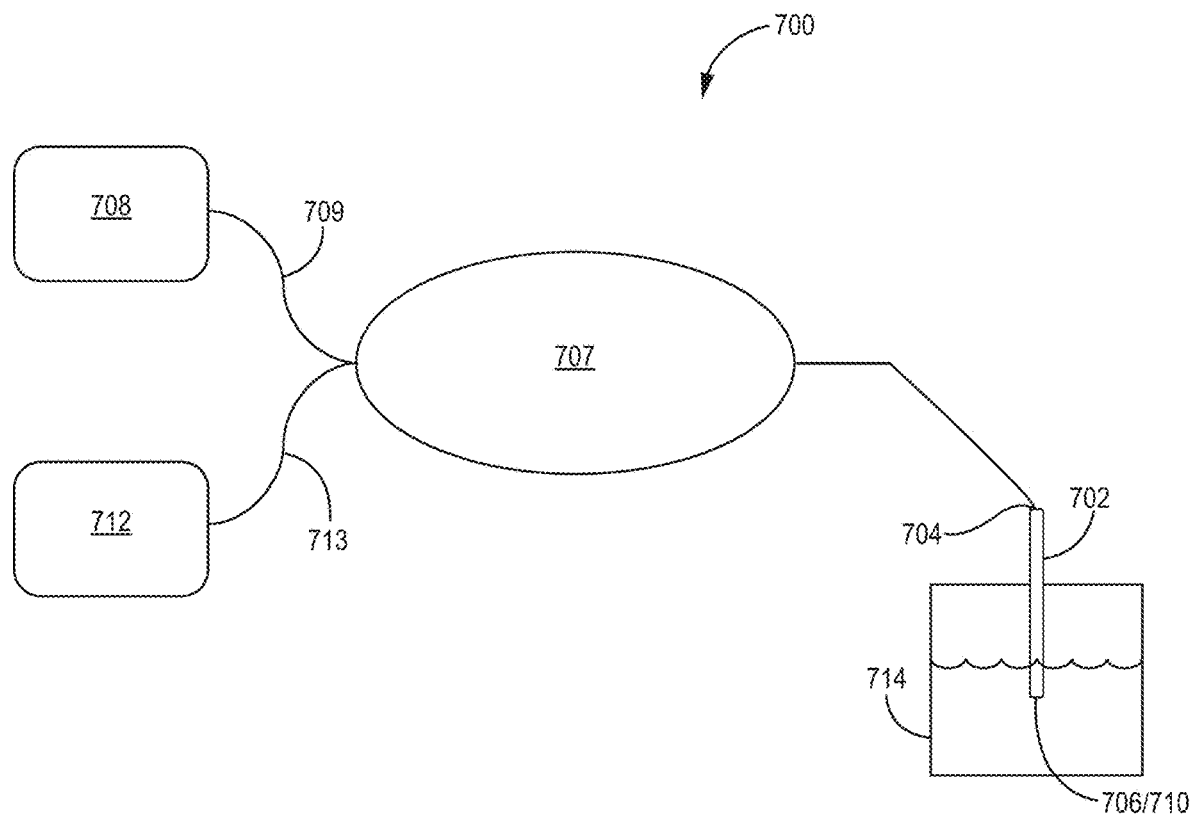
FIG. 7 is a schematic diagram of a system configured to operate in reflection mode in accordance with one or more embodiments of the invention.

Referring now to FIG. 7, a schematic diagram of a system 700 configured for operation in reflection mode is shown, according to one or more embodiments of the invention. In the illustrated embodiment, the system 700 includes a fiber optic probe 702. A proximal end 704 of the fiber optic probe 702 is coupled to a light source 708 via a first terminal 709 (e.g., an input terminal) of a coupler 707 and to a light sensor 712, such as an optical power meter, via a second terminal 713 (e.g., an output terminal) of the coupler 707. The coupler 707 can include a plurality of optical fibers, at least one of which is used for transmitting light from the light source 708 and one or more of which is used for guiding reflected light to the light sensor 712. A distal end portion 706 of the fiber optic probe 702 includes a sensor component 710, the sensor component 710 having an asymmetric microlens array imprinted on a stimuli-responsive polymeric material. During operation, the distal end portion 706 of the fiber optic probe 702 comprising the sensor component 710 can be exposed to an environment 714 and the maximum optical reflected power recorded by the light sensor 712 can be correlated to the property being sensed.

In some embodiments, a system is provided, wherein the system comprises a fiber optic probe including an optical fiber and a stimuli-responsive material, wherein the stimuli-responsive material has a first surface attached to the optical fiber and a second surface patterned with an asymmetric microlens array; a light source coupled to the fiber optic probe, wherein the light source is configured to transmit light through the optical sensor; and a light sensor for detecting light transmitted through the asymmetric microlens array or light reflected from the asymmetric microlens array.

In some embodiments, a system is provided, the system comprising a fiber optic probe including an optical fiber and a sensor component attached to the optical fiber, the sensor component including an asymmetric microlens array imprinted on a stimuli-responsive hydrogel; a light source coupled to the fiber optic probe, wherein the light source is configured to transmit light through the optical sensor; and a light sensor for detecting light transmitted through the asymmetric microlens array or light reflected from the asymmetric microlens array.

Figure 8A:
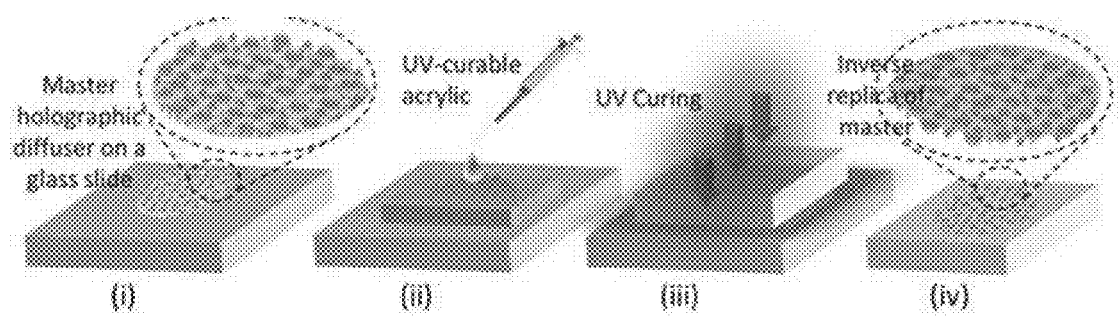
FIGS. 8A-8C are schematic diagrams illustrating (A) the fabrication of a hydrogel sensor imprinted with an asymmetric microlens array and constrained on a glass substrate, wherein a monomer solution was pipetted onto a master of the asymmetric microlens array and covered with a silanized glass slide before being exposed to UV-light for curing; (B) the fabrication of a biocompatible optical fiber, wherein a monomer solution was injected into a tube mold and polymerized by UV-light, which was then extracted by applying water pressure; (C) the fabrication of a fiber optic probe in which an end of the optical fiber is functionalized by dropcasting a droplet of 20 µl of a monomer solution on an asymmetric microlens array replica (or, in some instances, master) and a silanized optical fiber tip was contacted with the droplet and cured for 60 min, in accordance with one or more embodiments of the present invention.
Figure 8B:
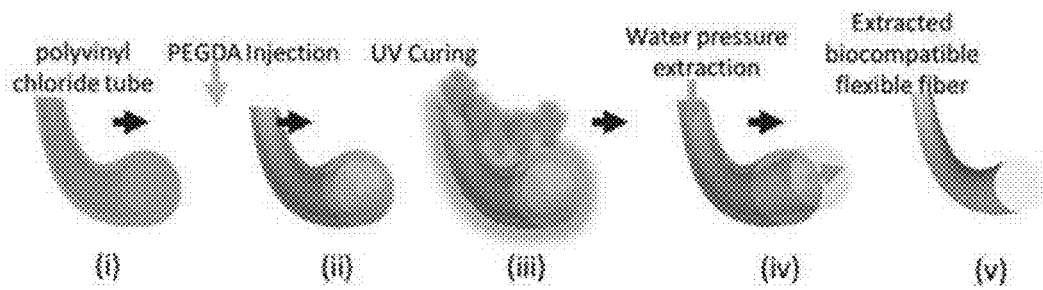
Figure 8C:
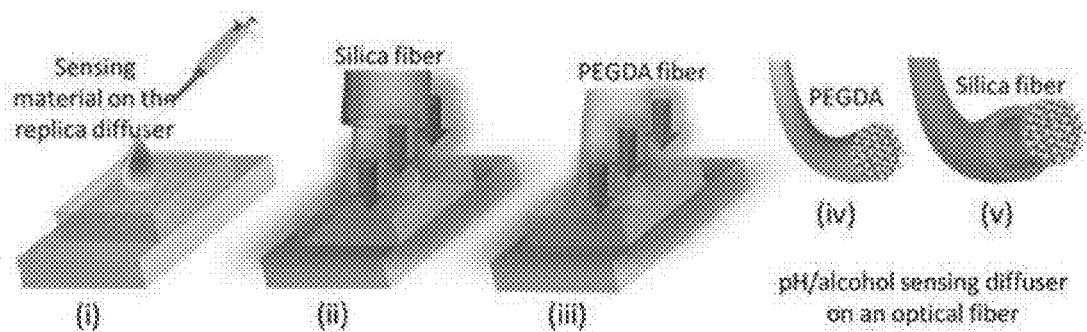

According to one or more embodiments, fiber optic probes comprising alcohol-responsive hydrogel sensors are provided. The fiber optic probes disclosed herein can be used for determining the volumetric modulation of stimuli-responsive polymers in real time. Asymmetric microlens structures (light diffusing microstructures) were imprinted on alcohol-responsive hydrogels during a UV curing process and used as stand-alone hydrogel sensors or chemically attached to the ends of silica and biocompatible optical fibers to form fiber optic probes. (FIGS. 8A-8C). Quantitative measurements were carried out using a smartphone to demonstrate the ease, simplicity, and practicality of the readout methodology. To demonstrate the utility in real-time sensing, the fiber optic probe was evaluated in various concentrations of ethanol, propan-2-ol, and dimethyl sulfoxide. To develop biocompatible probes for physiological applications, an asymmetric microlens array-imprinted polymer was attached to the end of a hydrogel optical fiber. The developed hydrogel fiber probes may have application in point-of-care diagnostics, continuous biomarker monitoring, and critical care sensing devices.

Figure 9A:
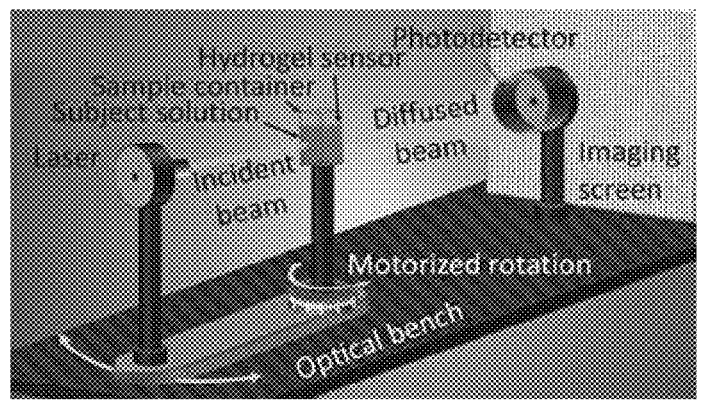
FIGS. 9A-9E relate to the interrogation of an alcohol-responsive hydrogel sensor attached chemically to a glass slide, showing (A) a schematic diagram of the setup utilized to interrogate the sensors which included a laser pointer, a sample holder, and a power meter; (B)-(D) graphical views of the spatial optical profile of the transmitted diffused light beam from the alcohol-responsive hydrogel based sensor while the sensor was tested in ethanol, propan-2-ol, and DMSO, respectively; and (E) a graphical view showing the maximum transmitted power ($P_t$) of the laser beam passing through the alcohol-responsive hydrogel based sensor submerged in various alcohol concentrations, in accordance with one or more embodiments of the present invention.
Figure 9B:
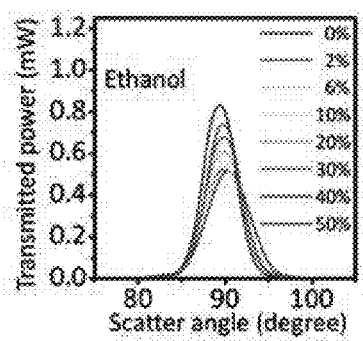

The stand-alone alcohol sensor was constrained on a glass slide and was evaluated in solutions having alcohol concentrations ranging from 0-50 vol %. The stand-alone sensor was equilibrated in DI water before testing and solutions containing various concentrations of ethanol, propan-2-ol, and DMSO were prepared. The sensor was submerged in DI water (1 ml) and was illuminated with a green laser of wavelength 532 nm (FIG. 9A). The spatial profile of the optical transmitted power ($S_t$) was recorded by an optical power meter and was taken as the reference. The DI water was replaced with an aqueous ethanol solution (2 vol %, 1 ml), and the $S_t$ was recorded again. The ethanol solution (2 vol %) was replaced by higher ethanol concentration (4 vol %), and the reading was recorded; this protocol was repeated until reaching an alcohol concentration of 50 vol % (FIG. 9B). The same procedure was followed to examine the sensor's sensitivity to propan-2-ol and DMSO.

Figure 9C:
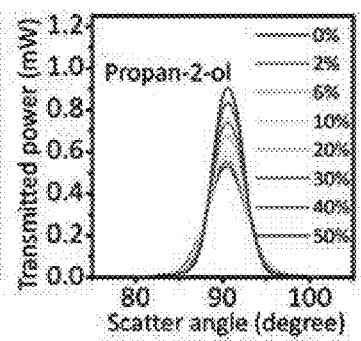
Figure 9D:
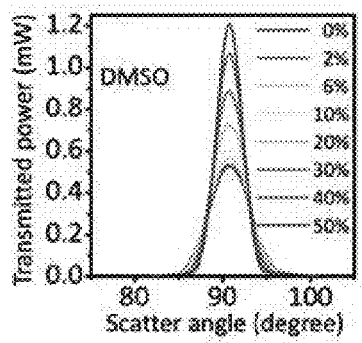
Figure 9E:
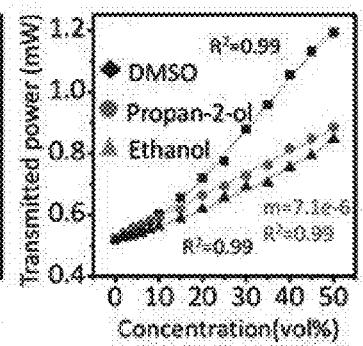

The optical transmitted power from the sensor exhibited a Gaussian profile. An increase in the maximum optical transmitted powers ($P_t$) was observed with increasing alcohol concentration. While not wishing to be bound to a theory, it is believed that this trend was observed due to decreasing scattering angles resulting from decreasing the diffusion efficiency of the microlens structures, thereby concentrating the transmitted power on a smaller solid angle and thus leading to a smaller circular area on the projection screen/photodiode sensor (FIGS. 9B-9D). The $P_t$ readings as a practical readout method were utilized to monitor the alcohol concentrations. The sensor responded to all the presented alcohols; however, it was more sensitive to DMSO as compared to propan-2-ol and ethanol, this was likely due to DMSO penetrating the hydrogel network (FIG. 9E). For example, the ability of an alcohol to penetrate and/or diffuse into a hydrogel matrix can increase when the alkyl chain length increases. The sensor's response to ethanol was nonlinear, with a sensitivity of ~4 µW vol %$^{-1}$ for low ethanol concentrations in the range of 0-10 vol %, which increased to ~6 µW vol %$^{-1}$ for higher concentrations in the range of 10 to 40 vol %, and reached ~20 µW vol %$^{-1}$ for ethanol concentrations in the range of 40-50 vol % (FIG.

9E). Further, the sensor's response to propan-2-ol was linear, with a sensitivity of ~7.3 µW vol %$^{-1}$ observed across the entire concentration range of 0-50 vol %. In addition, the sensor's response to DMSO was nonlinear for the entire tested concentration range (0-50 vol %). The sensitivity increased from ~8 µW vol %$^{-1}$ for concentrations in the range of 0-10 vol %, to ~12 µW vol %$^{-1}$ for concentrations in the range of 10-40 vol %, and to ~13 µW vol %$^{-1}$ for higher concentrations in the range of 40-50 vol % (FIG. 9E). The sensitivity of the hydrogel to alcohols could be controlled by varying the content of the cross linker; hence, the elasticity of the hydrogel film could be tuned. Unlike diffraction- and chromophore-based systems, the asymmetric microlens-based sensors disclosed herein were able to cover the entire alcohol concentration range 0-50 vol %.

For the remote sensing applications, the alcohol hydrogel sensor was chemically attached to an end of a multimode silica fiber having a diameter of 500 µm. The fabrication of the fiber optic probe included preparing a poly HEMA matrix which is an alcohol-responsive polymer, replicating the asymmetric microlens arrays, and attaching the hydrogel sensor to the end of the optical fiber. Advantageously, the fabrication was achieved in one step via a simple process. Unlike fiber optic probes based on Surface Plasmon resonance (SPR) or the interferometric spectroscopy, the fabrication process for the fiber optic probes disclosed herein was facile and rapid. Additional advantages of the fabrication processes disclosed herein are that a multitude of complicated steps can be avoided, such as pretreatment of the optical fiber, depositing a thin metal layer (plasmonic coating), immobilizing the hydrogel on the metal layer, and other stringent requirements such as the need for high-quality films.

Figure 10A:
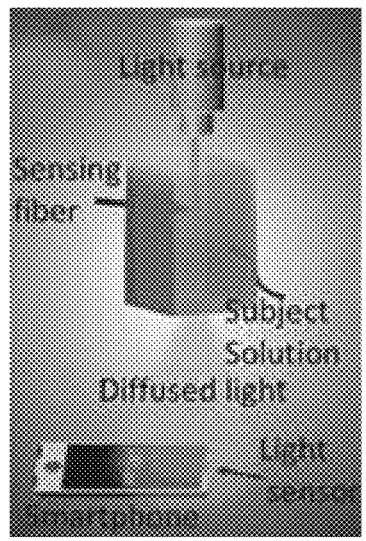
Figure 10B:
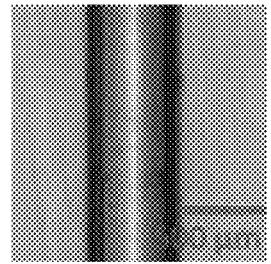
Figure 10C:
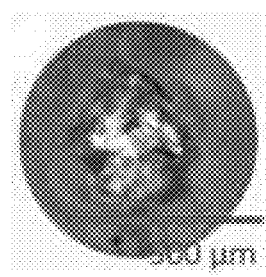
Figure 10D:
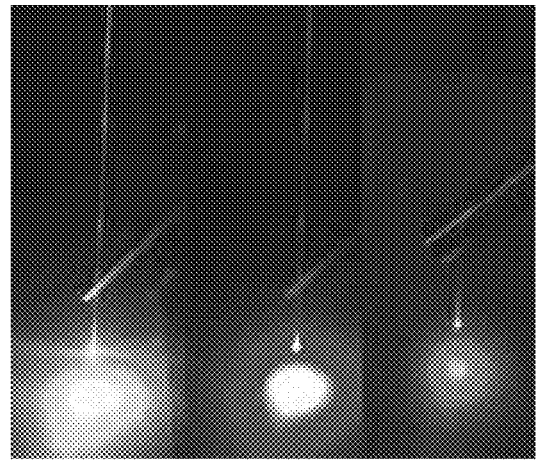

The fiber optic probe was tested for alcohol detection in the transmission and reflection configurations. Optical microscope images of the silica fiber and photos of the fiber probe guiding different laser beams are displayed in FIGS. 10B-10D. A green laser (532 nm) was coupled with the functionalized silica fiber and the output signals ($P_t$) were recorded by an optical power meter or a smartphone (FIG. 10A). Upon increasing the alcohol concentration, the probe exhibited a linear response to propan-2-ol and nonlinear responses to ethanol and DMSO. All results were consistent with the results discussed above involving the sensor constrained on a glass substrate. The fiber optic probe exhibited a higher sensitivity to DMSO than to propan-2-ol and ethanol. Starting from the identical $P_t$ values of 390 µW at 0 vol %, the $P_t$ recorded by the optical power meter showed an increase of ~246, 273, and 500 µW at 50 vol % concentrations of ethanol, propan-2-ol, and DMSO, respectively (FIG. 10E). Similarly, the maximum transmitted luminance ($L_t$) recorded by the smartphone showed an increase of ~181, 202, and 370 Lux at 50 vol % concentrations of ethanol, propan-2-ol, and DMSO, respectively (FIG. 10F). Output signal trends recorded by the smartphone and the optical power meter were analogous, confirming the reliability of the smartphone-based readout method. One of the multitude of advantages of the fiber optic probes disclosed herein is that they permit a simple and direct readout process that does not require complex data processing, expensive and bulky instrumentation, like computers. The fiber optic probes disclosed herein are compact and simple. Additionally, the fiber optic probes reduce the cost of the sensor by introducing cost-effective and portable instruments for recording the output signals (e.g., a smartphone can be used). Further advantages of the fiber optic probes include their low limit of detection (2%, v/v) compared with conventional fiber optic probes that depend on interferometry, Surface Plasmon resonance, Fresnel reflectometry, and total internal reflection phenomena. For instance, tapered fiber probe exhibit a LOD of 5% (v/v) for ethanol; Fabry-Periot fiber probes exhibit a LOD of 10% (w/w) for ethanol; fiber probes based on Surface Plasmon resonance exhibit a LOD of 10% (v/v); and fiber probes based on Fresnel reflectometry principal exhibit a LOD of 30% (v/v) for ethanol. Alcohol fiber probe based on the change in the total internal reflection exhibited higher LOD of 10% (v/v). Even colorimetric-responsive hydrogels based on inverse opal structure made of the same alcohol-responsive hydrogel (HEMA) showed LOD of 5% (v/v) for ethanol detection.

Figure 10G:
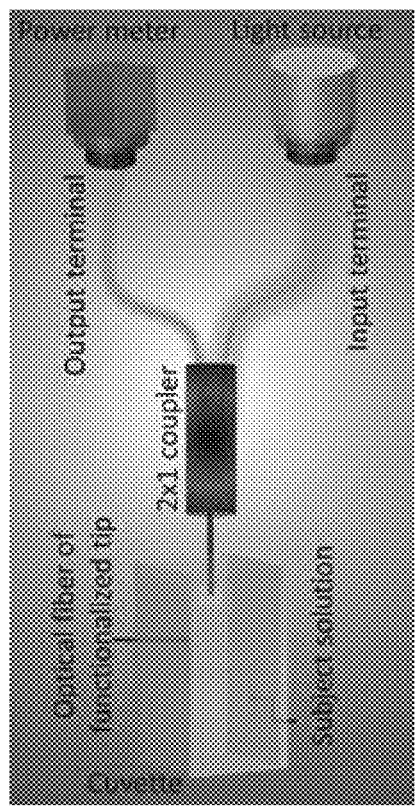
Figure 10H:
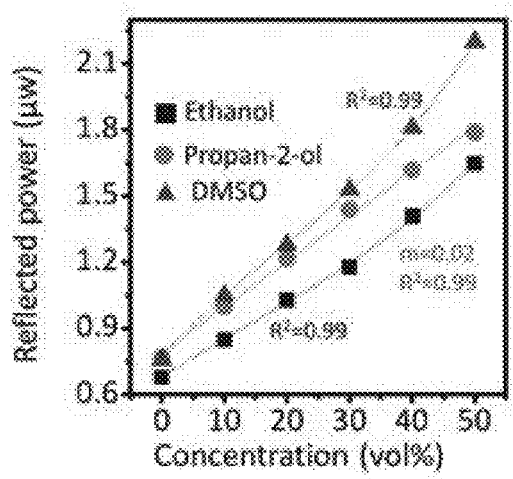
Figure 10I:
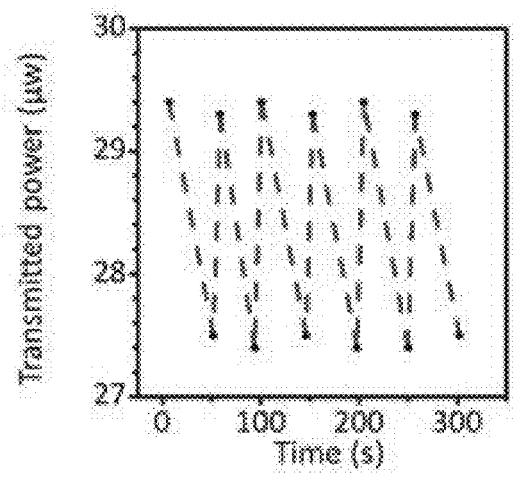

For implantable biosensing applications, the fiber optic probes were used in systems configured to operate in reflection mode. A broadband white light source was coupled to one of the terminals at the bifurcated side of a 2×1 coupler and the reflected power was collected from the second terminal at the same side using an optical power meter (FIG. 10G). The functionalized end of the probe was submerged in various alcohol concentrations. With increasing alcohol concentration, the hydrogel functionalized tip underwent a positive dimensional shift which increased the reflected power guided in the probe. At 50 vol % ethanol, propan-2-ol, and DMSO concentrations, maximum increases of ~0.7, 1, and 1.6 µW were recorded, respectively (FIG. 10H). The trend of the output signals in the reflection configuration was comparable to the trend in the transmission configuration as the response of the fiber probe was linear for propan-2-ol and nonlinear for ethanol and DMSO, in addition to the highest sensitivity being observed for DMSO and the lowest for ethanol. The reusability of the fiber probe was examined by exposing the fiber probe to ethanol solution (5%, v/v) for six cycles (FIG. 10I). The fiber probe was modulated over several cycles with limited random memory retention. The response time was short, within a few seconds, and the equilibrium time was about 60 seconds, which varied depending on the alcohol type and alcohol concentration.

Continuous monitoring of pH levels in blood and brain tissue of critically ill patients and patients suffering from a traumatic brain injury is a primary medical exigency. The pH levels of the brain can indicate tissue viability and decreases during brain insult from the normal pH 7.4 to 6.8. Additionally, continuous monitoring of the brain tissue pH might be useful in the treatment of comatose neurosurgical patients. While electrochemical sensors have been developed, hydrogel-based fiber optic probes may present unique advantages over electrochemical sensors as they are biocompatible for in vivo sensing and safer given that no electrical current is passed.

According to one or more embodiments, fiber optic probes comprising pH-responsive hydrogel sensors are provided. The fiber optic probes disclosed herein can be used for determining the volumetric modulation of stimuli-responsive polymers in real time. Asymmetric microlens structures (light diffusing microstructures) were imprinted on pH-responsive hydrogels during a UV curing process and used as stand-alone hydrogel sensors or chemically attached to the ends of silica and biocompatible optical fibers to form fiber optic probes. (FIGS. 8A-8C). Quantitative measurements were carried out using a smartphone to demonstrate the ease, simplicity, and practicality of the readout methodology. To demonstrate the utility in real-time sensing, the fiber optic probe was evaluated in solutions having varying pH levels. The fiber probe showed a rapid response to pH in the acidic region with a sensitivity of 40 nW pH$^{-1}$. To develop biocompatible probes for physiological applications, a microlens array-imprinted polymer was attached to the tip of a hydrogel optical fiber. The optical fiber probe in the refection configuration showed a sensitivity of 7 nW pH$^{-1}$. The developed hydrogel fiber probes may have application in point-of-care diagnostics, continuous biomarker monitoring, and critical care sensing devices.

Figure 11C:
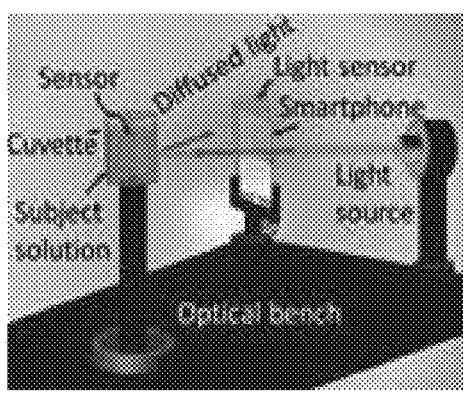
Figure 11D:
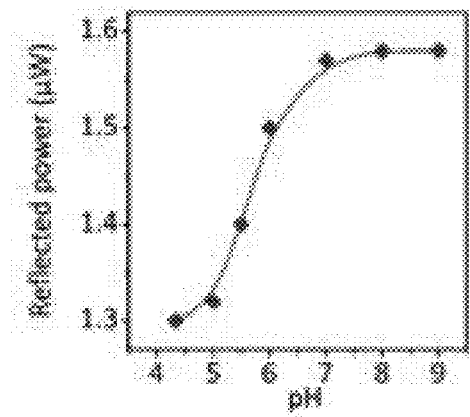

Asymmetric microlens structures (light diffusing microstructures) were imprinted on pH responsive-hydrogels during a UV curing process to create stand-alone and fiber integrated sensors (FIGS. 8A-8C). The stand-alone hydrogel pH sensor imprinted with the asymmetric microlens array and constrained on a glass slide was tested in transmission mode in various pH solutions (4.3-8.8) of ionic strength (150 mM) at 24° C. The sensor was submerged in pH solution (1 ml) and was illuminated with a laser beam (532 nm) and $S_t$ was recorded by an optical power meter. The sensor's volume experienced a positive shift with increasing pH of the solution due to the Donnan's potential resulting from ionization of the carboxyl group and dissolving of the carboxylates. Accordingly, the light diffusing efficiency of the sensor decreased, thus increasing $P_t$ on account of the forward scattering angle (FIG. 11A). Initially, the pH sensor significantly responded to pH level in the range of 5.0 to 7.0, with responses hard to detect in the alkaline region, where the output signal increased by ~1.7 µW (40%), as it increased from 4.2 µW to 5.9 µW upon increasing pH from 5.0 to 7.0 (FIG. 11B). When the pH was changed from 4.3 to 5.0, the sensor's output signal changed by ~8%, consistent with the pH sensor based on poly HEMA. The hydrogel pH sensor showed a similar response in the reflection mode as compared with the transmission mode, where the output signal significantly increased by ~19% with increasing pH from 5.0 to 7.0, and no response was recorded above pH 7.0 (FIG. 11D). The output signal changed by 1.5% when pH was increased from 4.3 to 5.0. The decrease of the sensor's sensitivity in the reflection mode was be attributed to the readout setup, where the sensor was illuminated at 45° and the detector was fixed at the same angle (FIG. 11C).

Figure 11E:
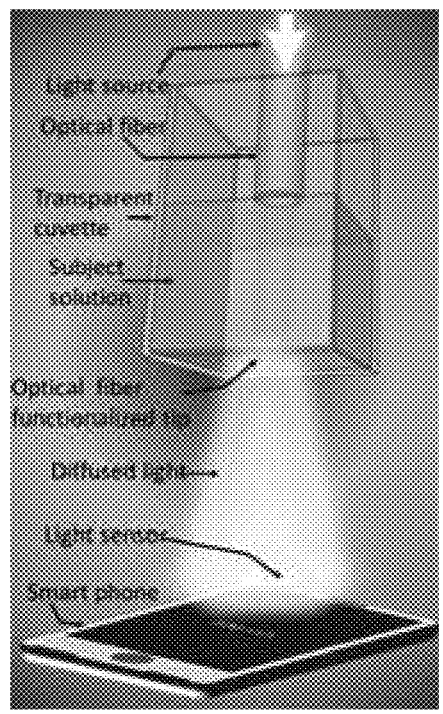
Figure 11H:
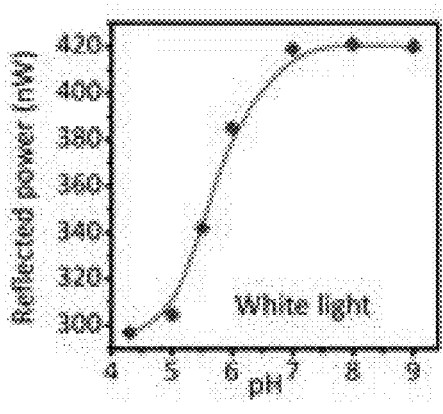

The hydrogel sensor was chemically attached to the tip of a silica optical fiber following the same protocol utilized to attach the alcohol sensor. The sensing investigations were carried out in both transmission and reflection modes (FIG. 11E). The response of the fiber optic probe to pH was comparable to the response of the constrained pH hydrogel sensor attached to the glass substrate (FIG. 11F). The trends of the output signals recorded by the smartphone and the power meter were same (FIGS. 11F-11G). The fiber optic probe was very sensitive in the pH range from 5.0 to 7.0 and displayed negligible response above pH 7.0. The recorded $L_t$ by the smartphone showed a change of ~40% upon changing the pH from 5.0 to 7.0, where a ~2% output change corresponded to a 0.1 pH increment. The response of the pH fiber probe in the reflection configuration was analogous to the transmission mode (FIG. 11H). An increase of 115 nW was measured in the output signal upon increasing the pH from 5.0 to 7.0, with the sensitivity of ~57 nW pH$^{-1}$. The fiber optic probe can be used for monitoring gastric pH which has a physiological range of 1-7, and for milk quality application as the milk pH lies in the range of 4.6-6.7. The fiber optic probes can be utilized in other applications, as the sensitivity of the fiber probe and the sensing range can be tailored by varying the ionizable co-monomer and its concentration. For example, to increase the sensitivity in the alkaline pH, the hydrogel network can be co-polymerized with 2-(dimethylamino) ethyl methacrylate (pK$_a$=8.4).

Figure 11I:
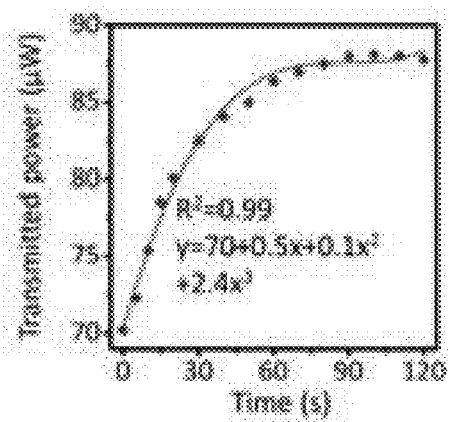

A key challenge of the pH-sensitive fiber probes for the real-time measurements in biological applications is the swelling and shrinkage kinetics. The response time of the fiber probe can depend on the concentration of the ionizable monomer (AA) and the ionic strength of the examined solution, where the response time is directly proportional to the ionizable monomer and inversely proportional to the buffer concentration. The fiber optic probe disclosed herein showed a rapid response as it reached the equilibrium within 60±10 s when the pH was changed from 5.5 to 6.0 and the output signal varied up to ~17.6 µW (FIG. 11I). Additionally, the fiber probe was examined for reusability by exposing it to consecutive swelling/shrinkage for three cycles and no hysteresis was observed (FIG. 11J). This behavior was consistent with the previous studies of polyHEMA-co-AA where the hydrogel sensor did not present a significant hysteresis in high ionic strength solution.

For the implantable biosensor applications, the silica fiber probe was replaced with a biocompatible fiber as the silica fiber causes inflammation in the implantation site and increases the risk of infection. The biocompatible fiber was made of polyethylene glycol diacrylate, functionalized with the pH-responsive hydrogel, and was examined for pH sensing in physiological conditions (FIG. 11K). The trend of the output signals against pH was comparable to the response of the silica fiber optic probe. The response of biocompatible fiber optic probe was considerable in the pH range of 5.0 to 7.0 and reached a plateau above pH 7.0. The sensitivity of the probe was ~10 nW pH$^{-1}$ in the pH range of 5.0 to 7.0 which is slightly less than that observed for the silica fiber optic probe and is likely due to inefficient light guiding of the biocompatible core bare fiber. This can be overcome by decreasing the guided light loss which can be achieved by covering the fiber core with a biocompatible clad having a low refractive index.

In contrast to fiber optic probes based on interferometric techniques, the developed fiber optic probes comprising hydrogel sensors imprinted with asymmetric microlens arrays do not require high quality films, coherent light sources, and complex and bulky readout setups. As compared to the SPR probes that require multistage and complicated fabrication processes, complex output signal processing, and costly instrumentation setups to obtain readouts, the asymmetric microlens array fiber optic probes disclosed herein can be fabricated via a simple single-stage process. In addition, the fiber optic probes disclosed herein are low-cost and portable. Unlike fluorescent probes, the measurement of the optical power is not prone to photobleaching and the corresponding shortcomings thereof. Additionally, the asymmetric microlens array increases the sensor's active area which enhances the diffusion rate of the analyte into the responsive-hydrogel, shortening sensor response time. The developed fiber optic probes can be functionalized with any of a wide array of stimuli-responsive hydrogels to sense glucose, proteins, nucleic acids, etc. and can also be utilized in drug delivery applications.

According to one or more embodiments, fiber optic probes are thus provided for remote sensing and implantable biosensing applications involving alcohol and varying pH levels. As described above, alcohol- and pH-responsive hydrogels were imprinted with asymmetric microlens arrays during a UV-curing process and were attached to the ends of optical fibers. Firstly, the alcohol and pH hydrogel sensors constrained on glass slides were interrogated in the transmission and reflection configurations. An optical power meter and a smartphone were employed for recording the output signals, which showed an analogous trend confirming the reliability of using the smartphones to simplify the readout methodology. Secondly, the fiber optic probes based on alcohol- and pH-responsive hydrogels showed similar responses to their hydrogel sensor counterparts constrained on glass slides irrespective of whether they were utilized in transmission mode or reflection mode. In addition, the biocompatible fiber optic probe showed an analogous response to the silica fiber probe; however, the biocompatible fiber showed less sensitivity, presumably due to light loss. The fiber optic probes, and related methods, bypass numerous steps involved in typical fabrication processes of conventional fiber optic probes based on hydrogels and offers economical cost and portable readout strategies for reducing operating costs of fiber optic probes. The developed sensors have demonstrable and/or promising applications in biological sensing, point-of-care diagnostics, as well as critical care devices for real-time measurements.

Continuous glucose monitoring can enable strict control of blood glucose concentration in diabetic and intensive care patients. Optical fibers have emerged as an attractive platform; however, their practical applications are hindered due to lack of biocompatible fiber materials, complex and impractical readout approaches, slow response times, and time-consuming fabrication processes.

According to one or more embodiments, fiber optic probes comprising glucose-responsive hydrogels are provided. The fiber optic probes can be used for continuous and/or intermittent glucose monitoring under physiological conditions. The quantification of glucose was demonstrated using smartphone-integrated fiber optic probes that overcome existing technical limitations. The fiber optic probes include a glucose-responsive hydrogel that was imprinted with an asymmetric microlens array, attached to the end of a multimode silica optical fiber during photopolymerization, and used as a sensor for glucose sensing under physiological conditions. A smartphone and an optical power meter were employed to record the output signals. The fiber optic probes showed high sensitivity (2.6 µW mM$^{-1}$), rapid response times, and high glucose selectivity in the physiological glucose range. In addition, the fiber optic probes attained glucose complexation equilibrium within 15 min. The lactate interference was also examined and found to be minimal, ~0.1% in the physiological range. A biocompatible hydrogel made of polyethylene glycol diacrylate was utilized to fabricate a flexible biocompatible hydrogel fiber to replace the silica fiber, and the end of the biocompatible hydrogel fiber was functionalized with the glucose-sensitive hydrogel during the ultraviolet light curing process. The biocompatible optical fiber was quickly fabricated by the molding, the readout approach was facile and practical, and the response to glucose was comparable to the functionalized silica fiber. The fabricated optical fiber sensors may have applications in wearable and implantable point-of-care and intensive-care continuous monitoring systems.

The fiber optic probes included a glucose recognition agent. The glucose recognition agent (3-(acrylamido)-phenylboronic acid) was crosslinked with acrylamide to create glucose-responsive hydrogel and an asymmetric microlens array (light diffusing microstructures) was imprinted on the hydrogel. The glucose-responsive hydrogel was chemically attached to the tip of a silica multimode fiber during the photopolymerization process. The functionalized fiber was interrogated for glucose quantification in transmission mode and reflection mode. Upon glucose complexation with the boronic acid groups immobilized in the hydrogel matrix, the hydrogel attached to the optical fiber shifted volumetrically, altering the curvatures of the imprinted asymmetric microlens array. The transmitted and the reflected optical powers of the functionalized fiber were measured by an optical power meter and a smartphone. In addition, the hydrogel sensor was attached to the end of a biocompatible hydrogel fiber. The biocompatible functionalized fiber was flexible and offered the convenience to be potentially implemented or implanted in biological tissues. The glucose-responsive fiber optic probe disclosed herein has additional advantages over the previously developed fiber optic probes, such as an easy readout process due to its compatibility with smartphones and the ability to provide readouts without output signal processing, rapid response times (e.g., about 30 s), short equilibrium times (e.g., about 15 min), and low-cost, glucose-selective, plug-and-play technology.

Figure 12A:
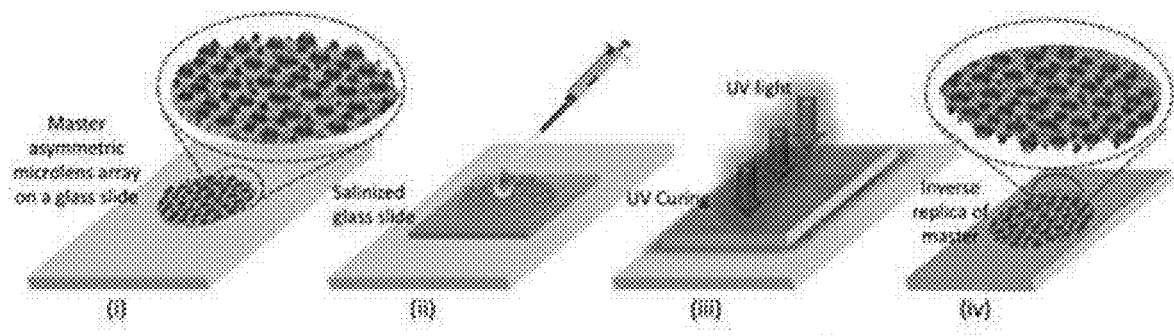
FIGS. 12A-12D are schematic diagrams showing (A) a method of preparing a glass-constrained glucose-responsive hydrogel sensor stamped with an asymmetric microlens array; (B)-(C) the functionalization process of the silica and hydrogel optical fibers; and (D) the fabrication process for the biocompatible hydrogel fiber, in accordance with one or more embodiments of the present invention.
Figures 12B, 12C:
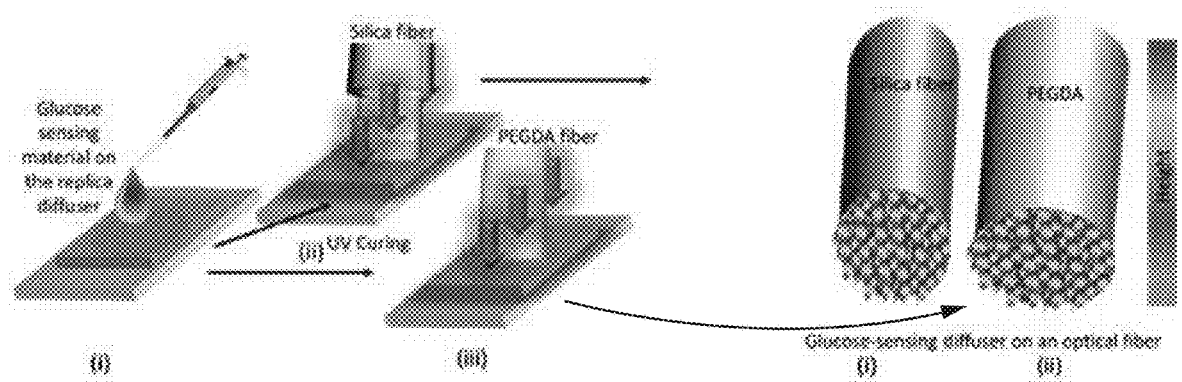
Figure 12D:
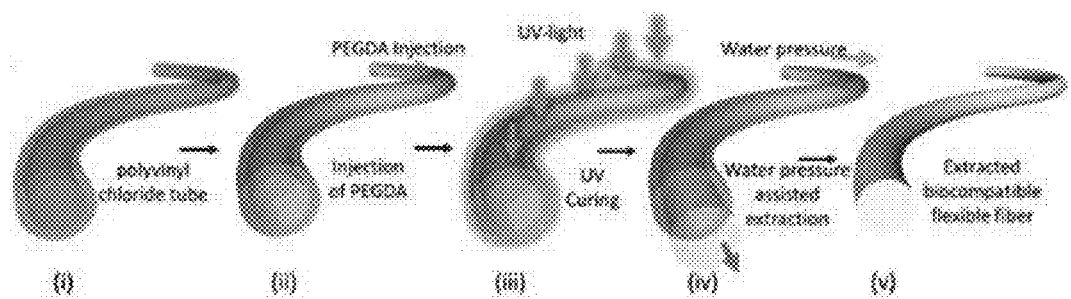
Figure 18:
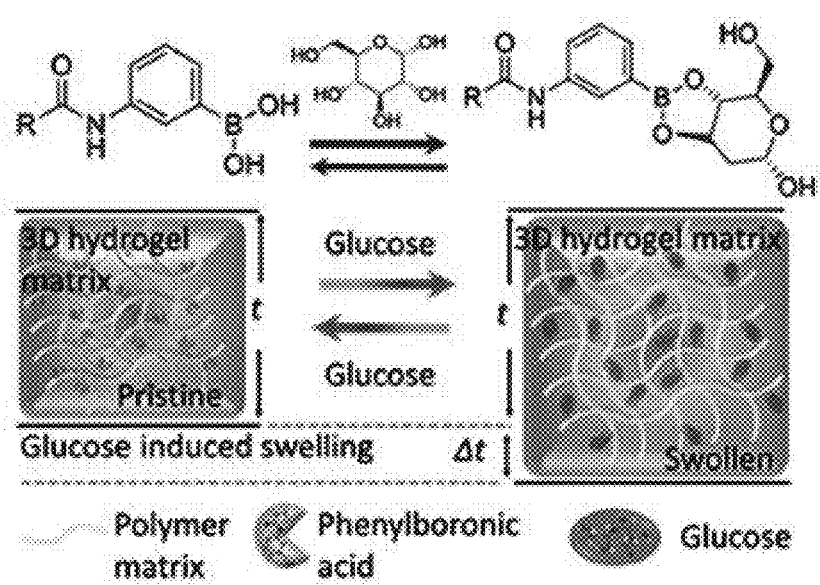
FIG. 18 is a schematic diagram showing glucose-boron complexation in a hydrogel matrix inducing a positive volumetric shift, in accordance with one or more embodiments of the present invention.

In some embodiments, the glucose-responsive hydrogel was fabricated, functionalized with 3-APBA, and stamped with asymmetric microlens arrays during photopolymerization (FIG. 12A). Distribution of the asymmetric microlens array and the optical microscope image are displayed in FIGS. 17A-17B. The stamped hydrogel sensor was attached to a commercial multimode silica fiber and an in-house made biocompatible fiber during the polymerization process (FIGS. 12B-12C). Fabrication of the biocompatible fibers is shown in FIG. 12D. The immobilized 3-APBA in the hydrogel matrix of the sensor had a high affinity to glucose molecules forming anionic boronate due to 1:1 complexation in the hydrogel network, increasing the osmotic Donnan pressure and causing a corresponding volumetric shift (FIG. 18). The volumetric shift of the hydrogel modified the curvature of the asymmetric microlens array stamped on the hydrogel's surface leading to a change in the focal length of the microlenses and thus the maximum transmitted/reflected power that was correlated to the measured glucose concentration.

Figure 13A:
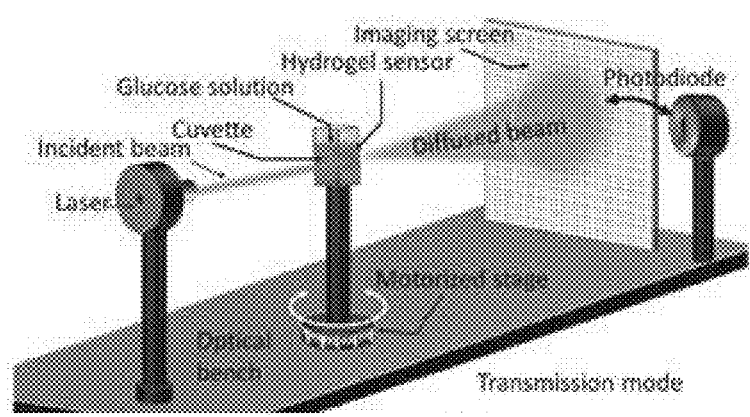
FIGS. 13A-13F relate to the quantification of glucose concentration by a glucose-responsive hydrogel sensor, showing (A) a schematic diagram of the setup utilized for recording glucose concentrations in transmission mode; (B) a graphical view showing the profile of the optical transmitted power passing through the sensor against glucose concentrations when the sensor was illuminated by a green laser (532 nm); (C) a graphical view showing the $P_t$ of the sensor at various glucose concentrations (0-50 mM), with the inset showing the glucose range of 0-20 mM; (D) a schematic diagram of the setup utilized for interrogating the glucose sensor in the reflection mode; (E) a graphical view showing the maximum transmitted illuminance ($L_t$) of the sensor versus glucose concentrations while the sensor was illuminated by the broadband white light beam, and the illuminance was recorded by an ambient light sensor of a smartphone; and (F) a graphical view of the $P_r$ of the hydrogel sensor for various glucose concentrations captured in reflection mode, with the inset showing the glucose concentrations range of 0-20 mM, in accordance with one or more embodiments of the present invention.
Figures 13B, 13C:
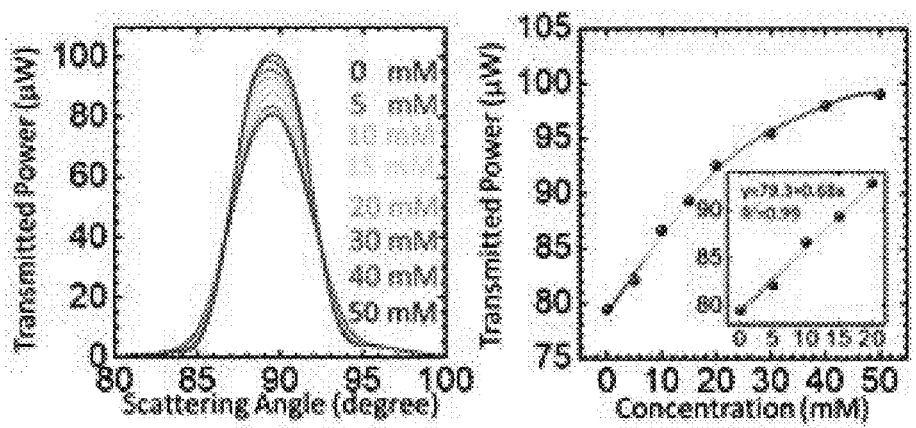

The glucose-responsive hydrogel sensor constrained on a glass substrate and stamped with an asymmetric microlens array was examined in various glucose concentrations (0 to 50 mM). The sensor was equilibrated in PBS solution (pH 7.4, ionic strength 150 mM, 24° C.) for 2 h before testing. A stock glucose solution (100 mM) was prepared in PBS buffer of pH 7.4 and diluted using the PBS solution to prepare the required glucose concentrations. The sensor was submerged in glucose-free PBS buffer solution (1 ml) and illuminated with a green laser (532 nm) and the spatial profile of the transmitted power ($SP_t$) was recorded as a reference (FIG. 13A). The glucose-free PBS buffer was replaced with a buffered glucose solution (1 ml, 5 mM), and the $SP_t$ was recorded after 15 min. The low glucose concentration (5 mM) was replaced with a higher concentration (10 mM) and the reading was recorded after 15 min, and this protocol was repeated until reaching 50 mM. The recorded $SP_t$ for the sensor in various glucose concentrations exhibited Gaussian-shaped profiles and the forward scattering angles decreased with increasing glucose concentrations. The diffused light formed a spot having a smaller diameter on the screen, increasing the maximum optical transmitted power ($P_t$) with glucose concentration (FIG. 13B). The $P_t$ readings as a practical readout method were utilized to monitor the glucose concentrations. The sensor's response saturated with increasing glucose concentration; however, it exhibited a linear response within the range of 0-20 mM, which had a correlation coefficient, $R^2$ of 0.99 (FIG. 13C). The $P_t$ increased from 79.4 to 86.7 µW when the glucose concentration increased from 0 to 10 mM, and reached 99 µW when the glucose concentration increased to 50 mM. To confirm the working principle, the surface morphology of the hydrogel sensor was investigated under the optical microscope while the sensor was submerged in glucose-free PBS buffer and PBS buffer of 50 mM glucose concentration.

Figure 13D:
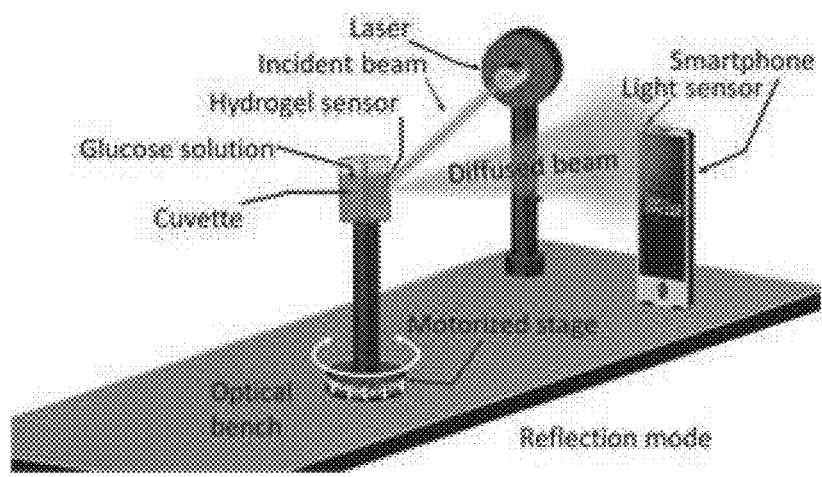
Figures 13E, 13F:
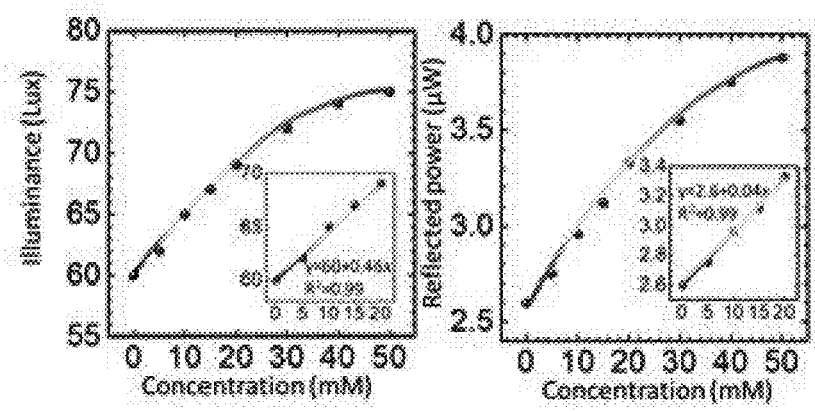

Upon glucose-boron complexation, the sensor swelled in z-direction only as it was constrained on the glass slide. The surface profile analysis showed that the depth of the microlens array was higher under glucose-free condition as compared to the surface's depth in glucose condition. Again, the hydrogel sensor was examined for glucose sensing, but in this test, the sensor was illuminated by a broadband white light beam and the output signals, the maxima transmitted illuminance ($L_t$), were measured by a smartphone (FIG. 13D). Thirdly, the sensor was interrogated in the reflection configuration as the sensor was illuminated by a monochromatic light (532 nm) at an incident angle of 45° and the maximum reflected powers ($P_r$) of the diffused beam were collected using an optical power meter (FIG. 13D). The ambient light sensor of a smartphone was utilized to record the output signals to demonstrate the compatibility and the simplicity of the readout process. The readout for the glucose-free buffer was 60 lux and jumped up to 69 upon increasing glucose concentrating from 0 to 20 mM and reached to 75 lux at 50 mM (FIG. 13E). The relationship of the glucose concentration against the sensor's output signal was consistent with the experiment carried out using the monochromatic light and the optical power meter (FIG. 13C). The sensor's response was linear for glucose concentration in the range of 0-20 mM with a correlation coefficient, $R^2$ of 0.99 and saturated at high glucose concentrations. The hydrogel sensor consistently detected glucose concentrations whether it was illuminated by a monochromatic light or a broadband white light and this is due to the ability of the microlenses array to control the beam shape of the monochromatic and white light. In reflection configuration, the $P_r$ increased with glucose concentration because of the positive volumetric shift of the hydrogel sensor, decreasing the curvature of the microlenses and consequently the light diffusion efficiency of the sensor (FIG. 13F). The sensor behavior was consistent with the experiments that were carried out in the transmission mode (FIG. 13C). The $P_t$ increased from 2.6 µW to 3.33 µW upon increasing glucose concentration to 20 mM and reached 3.88 µW at 50 mM (FIG. 13F). The sensor's output signals saturated at a high glucose concentration (30 mM) and the correlation coefficient had a linear relationship ($R^2$=0.99) for glucose concentration within the range 0-20 mM.

Figure 14A:
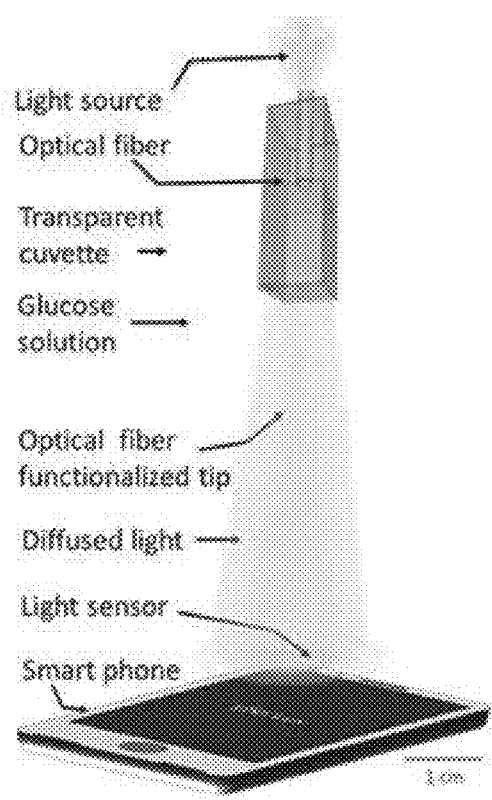
Figure 14B:
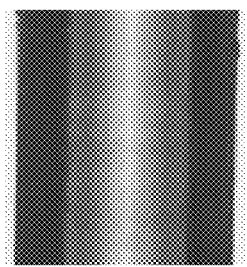
Figure 14C:
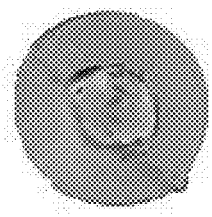
Figure 14D:
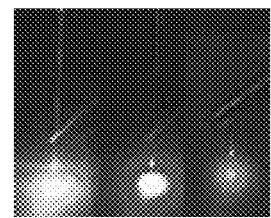

For in vivo or remote glucose sensing applications, the hydrogel sensor was attached to an end of a multimode silica fiber having a diameter of 500 µm. The silica fiber with the hydrogel sensor attached thereto was utilized for glucose detection in vitro in both transmission and reflection configurations. In transmission mode, the fiber optic probe was coupled to a monochromatic light source (532 nm) and the output signals ($P_t$) were recorded by either an optical power meter or a smartphone (FIG. 14A). Optical microscopy images of the fiber optic probe's cross-section and photos of the fiber optic probe illuminated by different monochromatic light sources (FIGS. 14B-14D). The fabrication process of the silica fiber optic probe included preparing the hydrogel matrix, functionalizing the hydrogel with 3-APBA, imprinting the functionalized hydrogel with the asymmetric microlens array, and attaching the hydrogel sensor to the end of an optical fiber. These steps were performed in a single step in about 5 min (FIG. 12B). This facile and rapid fabrication approach is one of the great advantages of the developed hydrogel sensor in comparison to other fiber optic probes such as fluorescent- and SPR-based probes. For instance, the preparation of the fluorescent glucose sensor requires multiple reaction stages and time-consuming synthesis and purification steps. Similarly, the fabrication of the SPR fiber probes is complicated and requires many steps, such as pretreatment of the optical fiber, decladding, depositing a thin metal layer, immobilizing the glucose sensitive layer, etc.

Figure 14E:
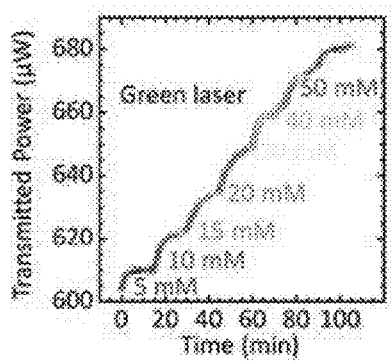
Figure 14F:
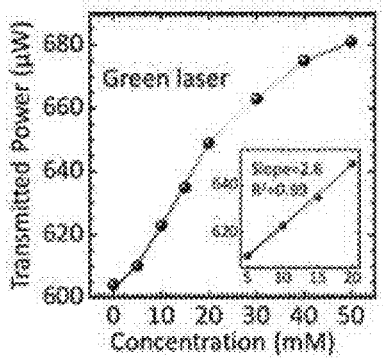
Figure 14G:
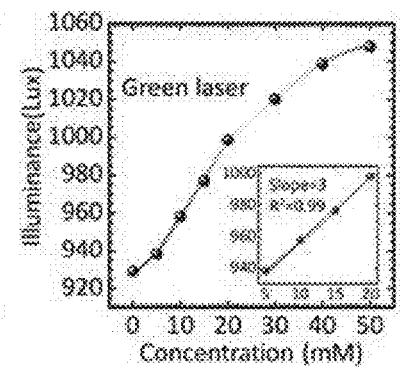

The fiber optic probe was tested in glucose concentrations ranging from 0-50 mM and the $P_t$ for each concentration over time was recorded at 24° C. (FIG. 14E). When the glucose concentration was increased, the fiber optic probe's output signal ($P_t$) increased, showing a linear trend with a correlation coefficient $R^2$ of 0.99 for glucose concentrations in the range of 5-20 mM. Upon increasing the glucose concentration from 0 to 20 mM, the $P_t$ surged 48 µW, from 602 to 650 µW (FIG. 14F). For high glucose concentrations ranging from 20 to 50 mM, the $P_t$ increased 30 µW, indicating declined sensitivity. An 8.3% change was observed when the glucose concentration was increased from 0 to 20 mM as compared to the 7% change over glucose concentrations ranging from 0-100 mM for conventional fiber probes. The fiber optic probe was coupled to a green laser and re-interrogated for glucose sensing, except a smartphone was employed to measure the output signals. The maximum transmitted illuminance ($L_t$) increased by 69 Lux, from 929 to 998 Lux with increasing glucose concentrations ranging from 0 to 20 mM; however, the growth of the output signal was 49 Lux when the glucose concentration increased from 20 to 50 mM (FIG. 14G). The trend of the recorded $L_t$ against the glucose concentrations was comparable to results recorded by the optical power meter. The fiber optic probe's response was linear for glucose concentrations in the range of 5-20 mM with a correlation coefficient $R^2$ of 0.99 and the sensitivity declined at high concentrations as the sensor saturated. To test the feasibility of utilizing the broadband white light for sensing as it is safer than lasers for human body implantation sensing, the fiber optic probe was coupled to a broadband white light source and re-examined for glucose concentrations in the range of 0-50 mM and the readout was collected by a smartphone and an optical power meter (FIG. 14H-14I). The trends of the output signals from the fiber optic probe immersed in various glucose concentrations were comparable, irrespective of whether the output signals were recorded by the smartphone or the optical power meter. The fiber optic probe's response decreased at high concentrations. Below 30 mM, the response was linear with a correlation sensor's saturation at high glucose concentrations might be attributed to the limited availability of boronate binding sites and the reduced elasticity of the hydrogel matrix that competed with the volumetric swelling process. The fiber optic probe interrogation results were similar to those from previous experiments in which the hydrogel glucose sensor was constrained on a glass substrate. The fiber sensitivity was 2.6 µW mM$^{-1}$ in the most significant glucose concentration range (5-20 mM), calculated using the slope of the linear fit. The output signal of the fiber optic probe shifted by a coefficient $R^2$ of 0.99. Advantageously, the probe's response to glucose concentrations was similar when the coupled light source was a broadband white light or a monochromatic light source, and the smartphone was successfully employed for readouts and showed a reliable response. The readout methodology was simple and low cost whether the output signal was recorded by a power meter or a smartphone. This is an advantage of the fiber optic probes disclosed herein in comparison to other conventional glucose probes. For instance, interferometric, fluorescent, and SPR fiber probes require processing of the output signal and high-cost instruments such as spectrophotometers and fluorometers for readout.

Figure 15A:
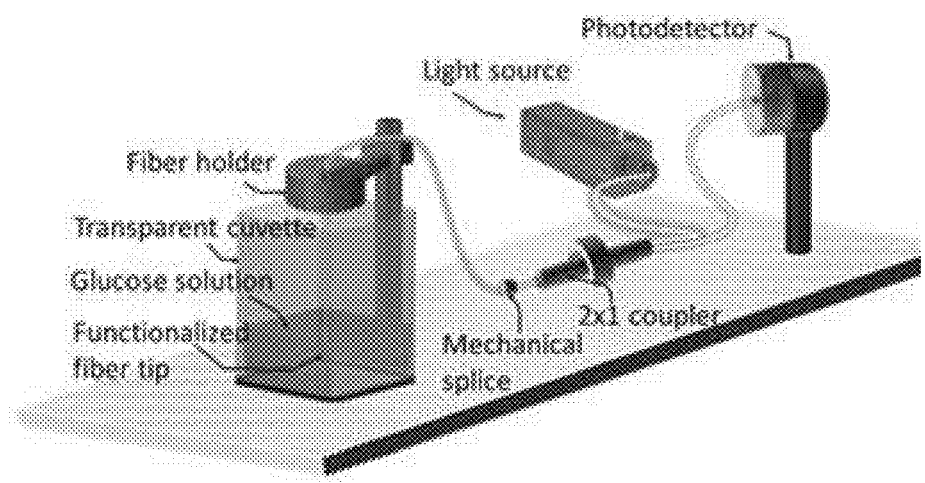
Figures 15B, 15C:
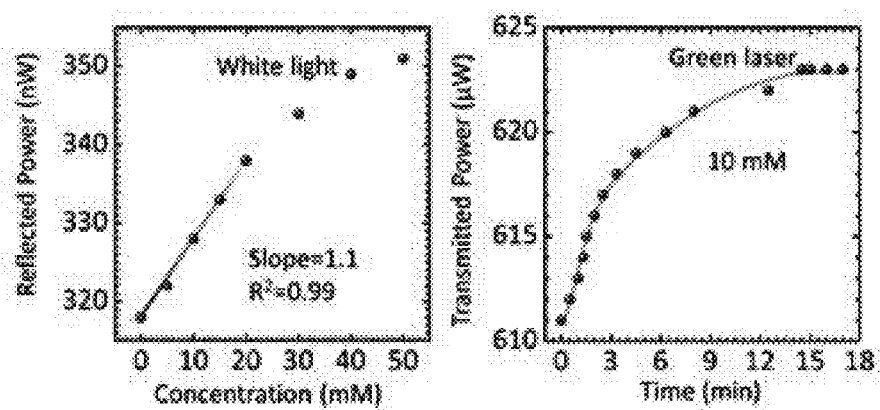

The silica fiber optic probe was also tested for glucose sensing within the concentration range of 0-50 mM in a reflection configuration, which is the desired mode for in vivo glucose sensing. In the reflection configuration, a three-terminal coupler 2×1 was utilized to connect the fiber optic probe with the white light source and the optical power meter (FIG. 15A). The fiber optic probe was submerged in the glucose solution (1 ml) and the optical reflected power ($P_r$) was recorded by the optical power meter. Upon swelling of the hydrogel sensor attached to the end of the optical fiber, the $P_r$ guided in the optical fiber increased (FIG. 15B). In reflection mode, the behavior of the output signal in response to changes in glucose concentrations was comparable to measurements obtained in transmission mode as the fiber response was linear within the concentration range of 0 to 20 mM with a correlation coefficient $R^2$ of 0.99, and the sensitivity decreased significantly above 20 mM. The optical reflected power was 318 nW for the glucose-free PBS buffer and increased to 338 nW at 20 mM concentration with a sensitivity of 1 nW $mM^{-1}$ in this glucose range. For the high glucose concentration range of 20-50 mM, the output signal recorded an increment of 13 nW.

The swelling dynamics of the fiber optic probe was studied at a constant glucose concentration (10 mM) as the $P_t$ was recorded over time. Upon exposure of the fiber optic probe to the glucose solution, the binding equilibrium (glucose-boron complexation) was saturated within 15 min and the response time was 30 s (FIG. 15C). This equilibrium time was one-third of the response times reported in previous studies, where the saturation time for the 3-APBA-modified optical fiber was 45 mM For the diabetic patients, the readout rate required for monitoring glucose concentration is 0.078 mM·$min^{-1}$, and the proposed probe provided a readout rate of 0.66 mM $min^{-1}$, which is 8-fold higher than the required speed. The stability and reusability of the silica fiber optic probe were investigated by detecting the response of the fiber optic probe in four complete and continuous cycles (FIG. 15D). The probe's response for 10 mM glucose concentration was monitored for 15 min, followed by a reset using an acetate buffer (pH 4.6) for ~10 s, and maintained in PBS for 15 min buffer before commencing the next cycle. When the probe was immersed in buffer at pH 4.6, the hydrogel sensor contracted due to the decrease in the pH below the apparent $pK_a$ value of the glucose-responsive hydrogel as the charged tetrahedral state of the 3-APBA transformed to uncharged trigonal planar form releasing the bound glucose molecules. Upon immersing the functionalized tip into the PBS buffer of pH 7.4, the attached hydrogel returned to it is original volume, and consequently the asymmetric microlens array was reset to its original geometry. These results are significant as the fiber optic probe exhibited reusability with limited hysteresis and had comparable sensitivity for each cycle. The boronic acids bind to cis-diol containing molecules and α-hydroxy acids. Fructose and galactose are monosaccharides present in human blood at low concentrations (<0.1 mM). In addition, there are many other sugars in blood in the form of glycoproteins and macromolecular carbohydrates; however, they are not expected to significantly interfere with the probe's response as they may not diffuse into the hydrogel matrix and bind to PBA groups because of their large molecular sizes. Thus, the glucose selectivity during in vivo sensing was expected to be minimal; however, lactate is present in blood at a concentration of 0.36-0.75 mM in healthy adults and has a high affinity to bind with phenylboronic acid by its α-hydroxy group. Thus, a potential interference of lactate on the probe's response was interrogated (FIG. 15E). The lactate solutions were prepared in PBS buffer (pH 7.4) and the probe's response for lactate and glucose were recorded separately at human body temperature (37° C.) to determine the potential interference of lactate under the physiological conditions. The recorded output signals ($P_t$) of the fiber optic probe shifted significantly at high lactate concentrations, but subtly any response was recorded at low lactate concentrations (1.0 mM). On the contrary, the output signal of the fiber optic probe considerably shifted at low glucose concentrations within the physiological range (4.0-8.0 mM) and the probe's response saturated at higher concentrations. At a lactate concentration of 5.0 mM, the output signal increased by 1.2% over 15 min as compared to 4% increase for the same concentration of glucose in the same interval. Therefore, the interference of the lactate according to its concentrations in blood would be 0.08%-0.17%. However, the small molecular weight (Mw: 90 g $mol^{-1}$) of lactate molecule accelerated its diffusion into the hydrogel matrix and its high affinity to bind with the pendant phenylboronic acid, it has a limited potential interference in the probe's response.

Figure 15F:
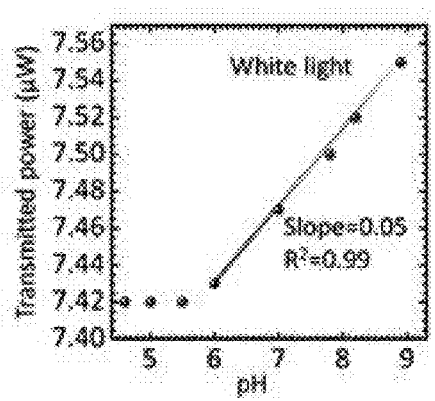
Figure 15G:
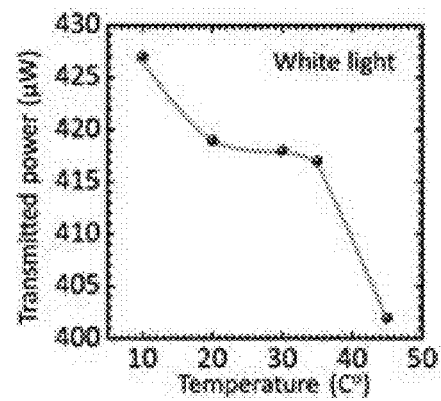

The effect of pH on the probe's response was examined as the probe was submerged in various pH solutions having the same ionic strength (150 mM) at 24° C. and the $P_t$ was recorded (FIG. 15F). Increasing the pH induced a positive volumetric shift leading to an incremental change of the recorded $P_t$. The probe's response for glucose detection can depend on the pH of the solution. The measured $P_t$ increased significantly starting from pH 6, which was due to swelling of the attached hydrogel sensor, caused by an increase in the anionic boronate ions in the hydrogel network. Decreasing the pH below 6 slightly shifted the output signal, indicating a tenuous growth in the anionic boronate ions. Furthermore, the effect of temperature on the fiber probe's response was investigated within the range of 10-45° C. Raising the solution temperature caused the glucose-responsive hydrogel to shrink or contract, enhancing the curvature of the imprinted microlenses, and consequently the output signal decreased. Within the temperature range of 20-35° C., the fiber probe's signal slightly shifted, whereas the output signals changed considerably below 20° C. and above 35° C. The output signal shifted by 2% when the temperature increased from 10 to 20° C., 0.5% with increases from 20 to 35° C., and 3.6% with increases to 45° C. (FIG. 15G). The fiber optic probe's response to glucose can be calibrated at physiological conditions to avoid the temperature and pH interferences.

Figure 16A:
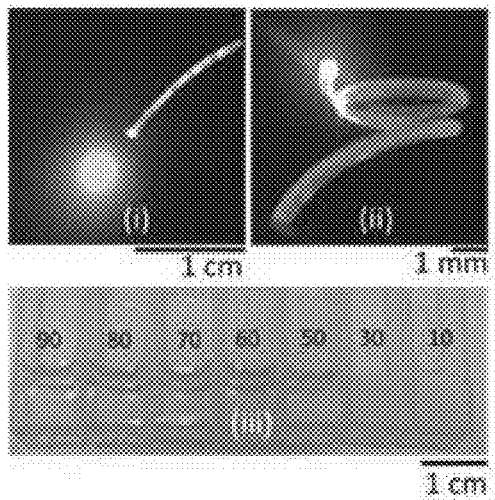
FIGS. 16A-16D relate to stimuli-responsive hydrogel sensors, showing (A) photographs of a fiber optic probe and a PEGDA hydrogel cubes of various precursor concentrations; (B) a graphical view showing the attenuation of green and red laser beams (532 and 650 nm) versus the precursor concentration (5-90 vol %); (C) a graphical view showing the attenuation of the white light by the hydrogels of 1 cm cube side versus the precursor concentrations; (D) a graphical view showing testing relating to the biocompatible functionalized fiber for glucose detection in the reflection configuration, where the optical reflected power values were recorded by the power meter versus glucose concentrations, in accordance with one or more embodiments of the present invention.
Figure 16B:
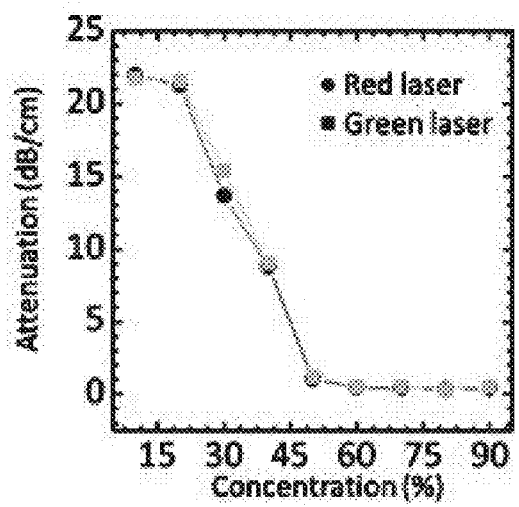
Figure 16C:
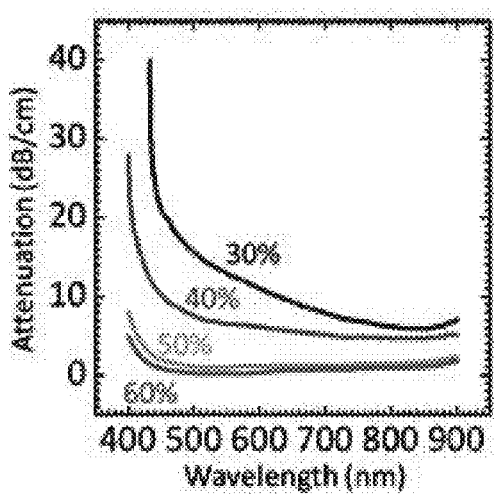
Figure 16D:
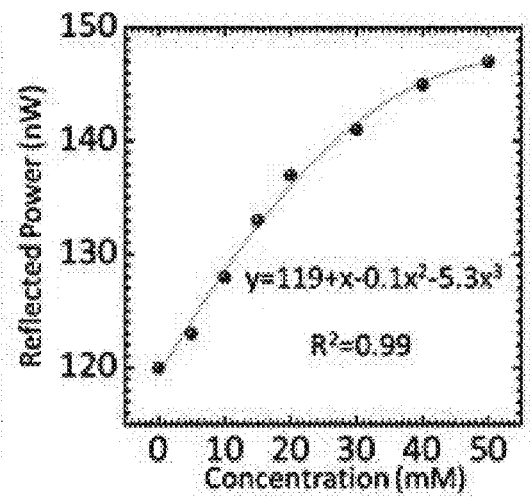

Silica fiber optic probes are not compatible with biological tissues to be implemented for in vivo sensing as they can cause inflammation at the implanted sites and discomfort to patients. Therefore, a biocompatible hydrogel fiber was fabricated to replace the silica fiber. A biocompatible polymer, polyethylene glycol diacrylate (PEGDA), was utilized to fabricate hydrogel optical fibers because PEGDA hydrogel counters the adsorption of proteins such as fibrinogen, albumin, and fibronectin that host the inflammatory cell interactions. Initially, polymerized PEGDA cubes of 1 cm side length were prepared at precursor concentrations of 5-90 vol % to determine the optimum concentrations for fabricating the hydrogel fiber (FIG. 16A). The hydrogel attenuation for monochromatic light (532 and 650 nm), and broadband white light were investigated. For monochromatic and white light, increasing the PEGDA concentration from 5 to 60 vol % considerably reduced the light attenuation, and above 60 vol % a slight change was detected (FIGS. 16B-16C). For monochromatic light, the attenuation was 22 dB $cm^{-1}$ at the precursor concentration of 10 vol % and decreased to ~1 dB $cm^{-1}$ when the precursor concentration reached 50 vol %. The attenuation decreased to ~0.4 dB cm$^{-1}$ with increasing the precursor concentration to 90 vol %. These results confirmed that the optical properties of the PEGDA hydrogel depended on the precursor concentration. The attenuation of the broadband white light measurements showed higher attenuation for short wavelengths besides the significant dependence of the attenuation on the precursor concentration. Considering the mechanical and optical properties, the hydrogel fiber was made using a PEGDA precursor concentration of 60 vol %. The end of the hydrogel optical fiber was functionalized with the glucose-responsive hydrogel as in the case of the silica fiber. The hydrogel fiber with a length of 5 cm and a diameter of 950 μm, was coupled with a broadband white light source and an optical power meter by the 2×1 coupler. The hydrogel fiber optic probe was interrogated for glucose sensing in reflection mode and the readings were recorded after 15 min for each glucose concentration. The output signal increased by 17 nW for glucose concentrations in the range of 0-20 mM and by 10 nW for glucose concentration changes from 20-50 mM, presenting an analogous response to the silica fiber optic probe discussed above (FIG. 16D). The trend of the output signal was linear for the glucose concentration range of 0 to 20 mM and above this concentration the sensitivity decreased considerably. Notably, the sensitivity of the hydrogel fiber optic probe was less than the silica fiber optic probe which might be attributed to the higher light loss in the hydrogel fiber as compared to the silica fiber, and which can be improved by cladding the hydrogel fiber with a low-refractive index material such as calcium alginate.

Fiber optic probes are thus provided for continuous glucose monitoring based on hydrogel sensors attached to the ends of silica optical fibers and biocompatible hydrogel optical fibers. The hydrogel sensors could be functionalized during the photopolymerization of the glucose-responsive hydrogel. The fabrication process of the fiber optic probe involved preparing the hydrogel, replicating the asymmetry microlens array, incorporating the 3-(acrylamido)phenylboronic acid, and attaching the hydrogel sensor to the end of the optical fiber. This process was executed in 5 min. The facile and rapid fabrication process is an advantage of the proposed fiber optic probe for glucose sensing. The PEGDA hydrogel was utilized to fabricate a biocompatible optical fiber that can potentially minimize the inflammation in the probe insertion site. The fiber optic probe's readout was simple, practical, and low cost as it did not require data processing or costly equipment. The output signals were recorded by either a smartphone or an optical power meter, utilizing broadband white light or monochromatic light sources for illuminating the probe. Glucose quantification tests were attained in both transmission and reflection configurations, and effect of pH and temperature on the probe's response was also examined. The silica fiber optic probe was highly sensitive and selective for glucose over lactate within the physiological range as the interference of lactate was trivial (0.1%). The developed probe presented significant optical, mechanical, and practical advantages than their previous counterparts in terms of ease fabrication process, rapid response, and practical readouts. The fiber optic probes thus can be used for applications involving in vivo glucose monitoring systems at point-of-care and intensive care units. To realize broader applications, the proposed fiber probe can be functionalized with chelating agents and aptamers for continuously sensing a wide range of biomolecules such as proteins, DNA, and RNA in clinical samples.

Discussion of Possible Embodiments

According to one aspect, a fiber optic probe can include an optical fiber, and a sensor component attached to the optical fiber, the sensor component including light diffusing microstructures (asymmetric microlens array) imprinted on a stimuli-responsive hydrogel.

The fiber optic probe of the preceding paragraph can optionally include, additionally, and/or alternatively, any one or more of the following features, configurations, and/or additional components.

In some aspects, the optical fiber is a biocompatible hydrogel fiber.

In some aspects, the asymmetric microlens array includes one or more microlenses, each of the one or more microlenses independently having a convex aspherical surface, a plano-convex aspherical surface, a convex-concave aspherical surface, a convex spherical surface, a plano-convex spherical surface, or a convex-concave spherical surface.

In some aspects, the asymmetric microlens array has at least one of the following characteristics: microlenses which are non-uniformly spaced apart; microlenses which are arranged in a non-periodic configuration; microlenses which are arranged in a non-ordered configuration; at least two microlenses having different surface topologies; at least two microlenses having different base geometries; and at least two microlenses having different heights.

In some aspects, the sensor component includes a glucose-responsive hydrogel.

In some aspects, the glucose-responsive hydrogel sensor includes acrylamide; N,N'-methylenebisacrylamide; 3-(acrylamido)-phenylboronic acid (3-APBA); and 2,2-dimethoxy-2-2phenylacetophenone (DMPA).

In some aspects, the sensor component includes an alcohol-responsive hydrogel.

In some aspects, the alcohol-responsive hydrogel sensor includes 2-hydroxyethylmethacrylate (HEMA); ethylene glycol dimethacrylate (EGDMA); and 2,2-dimethoxy-2-phenylacetophenone (DMPA).

In some aspects, the sensor component includes a pH-responsive hydrogel.

In some aspects the pH-responsive hydrogel sensor includes 2-hydroxyethylmethacrylate (HEMA); ethylene glycol dimethacrylate (EGDMA); acrylic acid (AA); and 2,2-dimethoxy-2-phenylacetophenone (DMPA).

According to a further aspect, a method of fabricating a fiber optic probe can include (a) depositing a light-curable stimuli-responsive hydrogel precursor solution on a substrate mold having a surface including an inverse asymmetric microlens array; (b) contacting an end portion of an optical fiber with the light-curable stimuli-responsive hydrogel precursor solution deposited on the substrate mold; and (c) exposing the end portion of the optical fiber and light-curable stimuli-responsive hydrogel precursor solution to light to form a stimuli-responsive hydrogel sensor imprinted with an asymmetric microlens array and attached to the end portion of the optical fiber.

The method of fabricating a fiber optic probe of the preceding paragraph can optionally include, additionally, and/or alternatively, any one or more of the following features, configurations, and/or additional components.

In some aspects, the light-curable stimuli-responsive hydrogel is synthesized, imprinted with the asymmetric microlens array, and attached to the end portion of the optical fiber in step (c).

In some aspects, the light-curable stimuli-responsive hydrogel precursor solution includes at least the following: a monomer, a crosslinking agent, and a photoinitiator.

In some aspects, the substrate mold is fabricated by depositing a light-curable prepolymer solution on a master light diffuser having a surface including a master asymmetric microlens array; exposing the deposited light-curable prepolymer solution to light to cure the prepolymer; and releasing the cured prepolymer from the master light diffuser to obtain the substrate mold, the substrate mold including the inverse asymmetric microlens array.

In some aspects, the optical fiber is fabricated by: injecting a light-curable monomer solution into a tubular body; exposing the monomer solution to light to initiate polymerization; and extracting a polymerized fiber from the tubular body to obtain the optical fiber.

In some aspects, the asymmetric microlens array includes one or more microlenses, each of the one or more microlenses independently having a convex aspherical surface, a plano-convex aspherical surface, a convex-concave aspherical surface, a convex spherical surface, a plano-convex spherical surface, or a convex-concave spherical surface.

According to another aspect, a system can include a fiber optic probe including an optical fiber and a sensor component attached to the optical fiber, the sensor component including an asymmetric microlens array imprinted on a stimuli-responsive hydrogel; a light source coupled to the fiber optic probe, wherein the light source is configured to transmit light through the optical sensor; and a light sensor for detecting light transmitted through the asymmetric microlens array or light reflected from the asymmetric microlens array.

The system of the preceding paragraph can optionally include, additionally, and/or alternatively, any one or more of the following features, configurations, and/or additional components.

In some aspects, the light sensor is a smartphone used to detect light transmitted through the asymmetric microlens array.

In some aspects, the light sensor is an optical power meter used to detect light reflected from the asymmetric microlens array.

In some aspects, the asymmetric microlens array has at least one of the following characteristics: microlenses having at least one of the following surfaces: a convex aspherical surface, a plano-convex aspherical surface, a convex-concave aspherical surface, a convex spherical surface, a plano-convex spherical surface, and a convex-concave spherical surface; microlenses which are non-uniformly spaced apart; microlenses which are arranged in a non-periodic configuration; microlenses which are arranged in a non-ordered configuration; at least two microlenses having different surface topologies; at least two microlenses having different base geometries; and at least two microlenses having different heights.

The following Examples are intended to illustrate the above invention and should not be construed as to narrow its scope. One skilled in the art will readily recognize that the Examiners suggest many other ways in which the invention could be practiced. It should be understood that numerous variations and modifications may be made while remaining within the scope of the invention.

EXAMPLE 1

Hydrogel Alcohol Sensor Fabrication

Ethylene glycol dimethacrylate (EGDMA) (98%), 2-hydroxyethyl methacrylate (HEMA) (97%), 2,2-dimethoxy-2-phenylacetophenone (DMPA) (99%), polyethylene glycol diacrylate (PEGDA) (mw: 700 Da), 2-hydroxy-2-methyl-propiophenone (2-HMP) (97%), dimethyl sulfoxide (DMSO) (99.9%), ethanol, propan-2-ol, sodium phosphate monobasic ($NaH_2PO_4$), sodium phosphate dibasic ($NaH_2PO_4$), and acrylic acid (AA) were purchased from Sigma Aldrich and used without further purification.

The precursor consisted of HEMA (92.5 mol %) and EGDMA (7.5 mol %) was mixed with DMPA (2% wt/vol) in propan-2-ol. The monomer solution (20 µl) was drop cast on the asymmetric microlens arrays (diffuser surface), covered with a salinized glass piece, and cured by a UV lamp (365 nm) for 1 h. The polymerized sensor was washed with DI water/ethanol (1:1, v/v) and preserved at 24° C.

EXAMPLE 2

Hydrogel pH Sensor Fabrication

Ethylene glycol dimethacrylate (EGDMA) (98%), 2-hydroxyethyl methacrylate (HEMA) (97%), 2,2-dimethoxy-2-phenylacetophenone (DMPA) (99%), polyethylene glycol diacrylate (PEGDA) (mw: 700 Da), 2-hydroxy-2-methyl-propiophenone (2-HMP) (97%), dimethyl sulfoxide (DMSO) (99.9%), ethanol, propan-2-ol, sodium phosphate monobasic ($NaH_2PO_4$), sodium phosphate dibasic ($NaH_2PO_4$), and acrylic acid (AA) were purchased from Sigma Aldrich and used without further purification.

The precursor consisted of HEMA (91.5 mol %), EGDMA (2.5 mol %), and acrylic acid (6 mol %), was mixed with DMPA in propan-2-ol (2%, wt/vol). The monomer solution (20 µl) was pipetted on the asymmetric microlens arrays, covered with a salinized glass piece, and cured by the UV lamp (365 nm) for 1 h. The polymerized sensor was washed with DI water/ethanol (1:1, v/v) and preserved at 24° C.

EXAMPLE 3

Hydrogel Optical Fiber Fabrication

PEGDA monomer was mixed with 2-hydroxy-2-methyl-propiophenone (2-HMP) (5 vol %) in DI water. The dilution of PEGDA in DI water was varied from 5 to 90 vol %. The prepared solution (200 µl) was injected into a polyvinyl chloride tube having an inner diameter of 1 mm and the tube was exposed to UV light (365 nm) for 30 min. The optical fiber was extracted from the tube by applying water pressure using a syringe. The optical fiber was washed with a mixture of ethanol and DI water (1:1, v/v). The tip of the fiber was functionalized with the pH-sensitive hydrogel by dipping the tip in a pH-sensitive solution (10 µl) that was pipetted on the asymmetric microlens arrays and was exposed to UV light for 1 h. To create a probe, the tip of the fiber was salinized and dipped in either alcohol or pH-sensitive solutions during the curing process. The functionalized tip was washed in DI water/ethanol (1:1, v/v) and preserved at 24° C.

EXAMPLE 4

Testing the Hydrogel Sensor Constrained on the Glass Slide

The stimuli-responsive hydrogel imprinted with microlens arrays and attached chemically on the glass slide was submerged in 1 ml of the tested solution in a plastic cuvette fixed on a rotating stage. White light source or laser pointer was fixed on the same rotating stage to illuminate the senor. $S_t$, and $P_t$ were recorded by a photodiode that was fixed and immobile on the optical bench. Also, the smartphone was

EXAMPLE 5

Testing the Fiber Probe in the Transmission Mode

The fiber probe was coupled with a white light source/laser pointer at one end and the other end that is functionalized was soaked in the tested solution container. Below the tested solution container, the photodiode detector/smartphone was fixed to collect the $P_t/L_t$.

EXAMPLE 6

Testing the Fiber Probe in the Reflection Mode

The fiber probe was coupled with the seven fibers terminal of 2×1 coupler. The light source was connected with the coupler terminal of only one fiber and the photodiode was connected with coupler terminal of six fibers. Therefore, one fiber was illuminating the sensing probe and the six fiber were collecting the reflected light in the probe to be guided into the photodetector.

EXAMPLE 7

Glucose Monitoring

Materials. Polyethylene glycol diacrylate (PEGDA) (mw: 700 Da), acrylamide (AM) (98%), 3-(acrylamido)-phenylboronic acid (3-APBA) (98%), sodium L-lactate, N,N-methylenebisacrylamide (99%), D-(+) glucose (99.5%), 2,2-dimethoxy-2-phenylacetophenone (DMPA) (99%), 2-hydroxy-2-methylpropiophenone (2-HMP) (97%), phosphate buffered saline tablets (PBS), dimethyl sulfoxide (DMSO) (99.9%), sodium phosphate monobasic ($NaH_2PO_4$), and sodium phosphate dibasic ($NaH_2PO_4$) were purchased from Sigma Aldrich and used without further purification.

EXAMPLE 8

Fabrication of the Hydrogel Sensor Constrained on a Glass Slide

The precursor solution consisted of acrylamide (78.5 mol %), N, N'-methylenebisacrylamide (1.5 mol %), and 3-APBA (20 mol %) was mixed with DMPA (2% wt/vol) in DMSO and the monomer dilution was 1:2 wt/vol. The monomer solution (100 μl) was drop-cast on the asymmetric microlens array surface, and subsequently, was covered with a salinized glass piece, and was polymerized by UV lamp (365 nm) for 5 min. The polymerized sensor was washed with DI water/ethanol (1:1 v/v) and preserved in PBS solution at pH 7.4.

EXAMPLE 9

Functionalization of the Silica and the Hydrogel Fibers

To functionalize the optical fiber with the glucose responsive hydrogel, the fiber's tip was silanized and dipped in the glucose-sensitive solution (10 μl) that was drop-cast on the asymmetric microlens array surface (AMLA) and was exposed to the UV light for 5 min. The functionalized fiber was preserved in the PBS solution at pH 7.4.

EXAMPLE 10

Fabrication of the Biocompatible Optical Fiber

PEGDA monomer was mixed with 2-hydroxy-2-methylpropiophenone (2-HMP) (5 vol %) in DI water. The dilution of PEGDA in DI water was varied from 5 to 90 vol %. The prepared solution (200 μl) was injected into a polyvinyl chloride tube with an inner diameter of 1 mm and the tube was exposed to UV light (365 nm) for 30 min. The optical fiber was extracted from the tube by applying water pressure using a syringe. The optical fiber was washed with a mixture of ethanol and DI water (1:1, v/v).

What is claimed is:

1. A fiber optic probe comprising:
   an optical fiber, and
   a sensor component attached to the optical fiber, the sensor component including light diffusing microstructures imprinted on a stimuli-responsive hydrogel, wherein the light diffusing microstructures form an asymmetric microlens array.

2. The fiber optic probe of claim 1, wherein the optical fiber is a biocompatible hydrogel fiber.

3. The fiber optic probe of claim 1, wherein the asymmetric microlens array includes one or more microlenses, each of the one or more microlenses independently having a convex aspherical surface, a plano-convex aspherical surface, a convex-concave aspherical surface, a convex spherical surface, a plano-convex spherical surface, or a convex-concave spherical surface.

4. The fiber optic probe of claim 1, wherein the asymmetric microlens array has at least one of the following characteristics:
   microlenses which are non-uniformly spaced apart;
   microlenses which are arranged in a non-periodic configuration;
   microlenses which are arranged in a non-ordered configuration;
   at least two microlenses having different surface topologies;
   at least two microlenses having different base geometries; and
   at least two microlenses having different heights.

5. A fiber optic probe of claim 1, wherein the sensor component includes a glucose-responsive hydrogel.

6. The fiber optic probe of claim 5, wherein the glucose-responsive hydrogel sensor includes acrylamide; N,N'-methylenebisacrylamide; 3-(acrylamido)-phenylboronic acid (3-APBA); and 2,2-dimethoxy-2-2phenylacetophenone (DMPA).

7. A fiber optic probe of claim 1, wherein the sensor component includes an alcohol-responsive hydrogel.

8. The fiber optic probe of claim 7, wherein the alcohol-responsive hydrogel sensor includes 2-hydroxyethylmethacrylate (HEMA); ethylene glycol dimethacrylate (EGDMA); and 2,2-dimethoxy-2-phenylacetophenone (DMPA).

9. A fiber optic probe of claim 1, wherein the sensor component includes a pH-responsive hydrogel.

10. The fiber optic probe of claim 9, wherein the pH-responsive hydrogel sensor includes 2-hydroxyethylmethacrylate (HEMA); ethylene glycol dimethacrylate (EGDMA); acrylic acid (AA); and 2,2-dimethoxy-2-phenylacetophenone (DMPA).

11. A method of fabricating a fiber optic probe, comprising:
   (a) depositing a light-curable stimuli-responsive hydrogel precursor solution on a substrate mold having a surface including an inverse asymmetric microlens array;
   (b) contacting an end portion of an optical fiber with the light-curable stimuli-responsive hydrogel precursor solution deposited on the substrate mold; and
   (c) exposing the end portion of the optical fiber and light-curable stimuli-responsive hydrogel precursor solution to light to form a stimuli-responsive hydrogel sensor imprinted with an asymmetric microlens array and attached to the end portion of the optical fiber.

12. The method of claim 11, wherein the light-curable stimuli-responsive hydrogel is synthesized, imprinted with the asymmetric microlens array, and attached to the end portion of the optical fiber in step (c).

13. The method of claim 11, wherein the light-curable stimuli-responsive hydrogel precursor solution includes at least the following: a monomer, a crosslinking agent, and a photoinitiator.

14. The method of claim 11, wherein the substrate mold is fabricated by:
   depositing a light-curable prepolymer solution on a master light diffuser having a surface including a master asymmetric microlens array;
   exposing the deposited light-curable prepolymer solution to light to cure the prepolymer; and
   releasing the cured prepolymer from the master light diffuser to obtain the substrate mold, the substrate mold including the inverse asymmetric microlens array.

15. The method of claim 11, wherein the optical fiber is fabricated by:
   injecting a light-curable monomer solution into a tubular body;
   exposing the monomer solution to light to initiate polymerization; and
   extracting a polymerized fiber from the tubular body to obtain the optical fiber.

16. The method of claim 11, wherein the asymmetric microlens array includes one or more microlenses, each of the one or more microlenses independently having a convex aspherical surface, a plano-convex aspherical surface, a convex-concave aspherical surface, a convex spherical surface, a plano-convex spherical surface, or a convex-concave spherical surface.

17. A system comprising:
   a fiber optic probe including an optical fiber and a sensor component attached to the optical fiber, the sensor component including an asymmetric microlens array imprinted on a stimuli-responsive hydrogel;
   a light source coupled to the fiber optic probe, wherein the light source is configured to transmit light through the optical sensor; and
   a light sensor for detecting light transmitted through the asymmetric microlens array or light reflected from the asymmetric microlens array.

18. The system of claim 17, wherein the light sensor is a smartphone used to detect light transmitted through the asymmetric microlens array.

19. The system of claim 17, wherein the light sensor is an optical power meter used to detect light reflected from the asymmetric microlens array.

20. The system of claim 17, wherein the asymmetric microlens array has at least one of the following characteristics:
   microlenses having at least one of the following surfaces: a convex aspherical surface, a plano-convex aspherical surface, a convex-concave aspherical surface, a convex spherical surface, a plano-convex spherical surface, and a convex-concave spherical surface;
   microlenses which are non-uniformly spaced apart;
   microlenses which are arranged in a non-periodic configuration;
   microlenses which are arranged in a non-ordered configuration;
   at least two microlenses having different surface topologies;
   at least two microlenses having different base geometries; and
   at least two microlenses having different heights.

* * * * *